: US 9,244,278 B2
(45) Date of Patent: Jan. 26, 2016

(12) United States Patent
Sugiyama et al.

(54) COMPUTER GENERATED HOLOGRAM TYPE DISPLAY DEVICE

(71) Applicant: Panasonic Corporation, Osaka (JP)

(72) Inventors: Keiji Sugiyama, Kyoto (JP); Kenichi Kasazumi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 274 days.

(21) Appl. No.: 13/858,329

(22) Filed: Apr. 8, 2013

(65) Prior Publication Data
US 2013/0265623 A1 Oct. 10, 2013

(30) Foreign Application Priority Data

Apr. 10, 2012 (JP) ................. 2012-088972

(51) Int. Cl.
G03H 1/00 (2006.01)
G02B 5/32 (2006.01)
G02B 27/22 (2006.01)
G02B 27/01 (2006.01)

(52) U.S. Cl.
CPC ........ G02B 27/0172 (2013.01); G02B 27/0103 (2013.01); G02B 27/017 (2013.01); G02B 2027/011 (2013.01); G02B 2027/014 (2013.01)

(58) Field of Classification Search
None
See application file for complete search history.

(56) References Cited

U.S. PATENT DOCUMENTS

| 2006/0250671 A1 | 11/2006 | Schwerdtner et al. |
| 2007/0024999 A1 | 2/2007 | Crossland et al. |
| 2007/0113012 A1 | 5/2007 | Cable et al. |
| 2009/0225380 A1 | 9/2009 | Schwerdtner et al. |
| 2010/0097580 A1* | 4/2010 | Yamamoto et al. ............. 353/69 |
| 2011/0164067 A1* | 7/2011 | Lewis et al. ................... 345/690 |
| 2012/0105580 A1 | 5/2012 | Cable et al. |

FOREIGN PATENT DOCUMENTS

| JP | 8-240773 | 9/1996 |
| JP | 2008-541145 | 11/2008 |
| JP | 4795249 | 10/2011 |

OTHER PUBLICATIONS

Ken-ichi Tanaka et al., "Estimation of optimal error diffusion for computer-generated holograms", Kyushu Institute of Technology (Japan), Proc. SPIE 3491, 1998 International Conference on Applications of Photonic Technology III: Closing the Gap Between Theory, Development, and Applications, 1017 (Dec. 4, 1998); doi: 10.1117/12.328674.

* cited by examiner

*Primary Examiner* — Jade R Chwasz
(74) *Attorney, Agent, or Firm* — Wenderoth, Lind & Ponack, L.L.P.

(57) ABSTRACT

A display device includes: a light source; an illumination optical system; a diffraction pattern generation unit; a spatial modulation element that generates diffracted light; and a shielding unit that selectively enters a first state where a first and second partial areas are a transmitting and shielding areas, respectively, and a second state where the first and second partial areas are the shielding and transmitting areas, respectively. The spatial modulation element displays the fictive image on a first and second display areas corresponding to the first and second partial areas when the shielding unit is in the first and second states, respectively. The diffraction pattern generation unit generates a first and second portion diffraction patterns from an image in an area corresponding to the first and second display areas out of the original image when the shielding unit is in the first and second states, respectively.

17 Claims, 33 Drawing Sheets

| VISUAL ACUITY | DISTANCE OF RECONSTRUCTED IMAGE |
|---|---|
| 1.0 OR MORE | 1m |
| 0.9 | 0.9m |
| ... | ... |
| 0.3 OR LESS | 0.3m |

9021

FIG.10
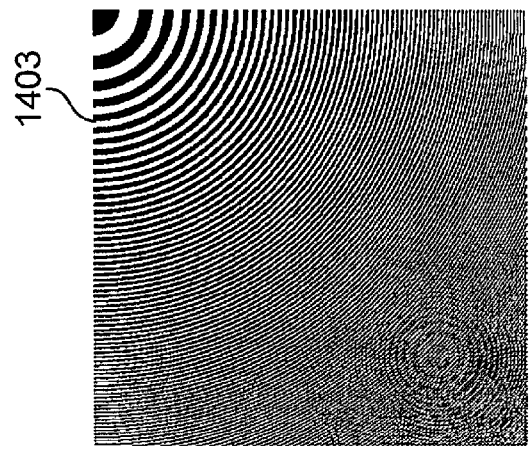
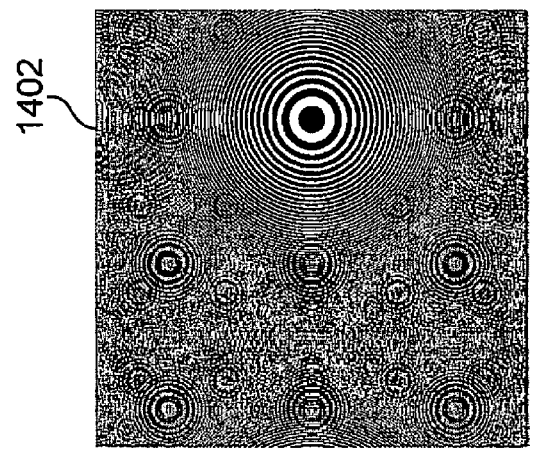
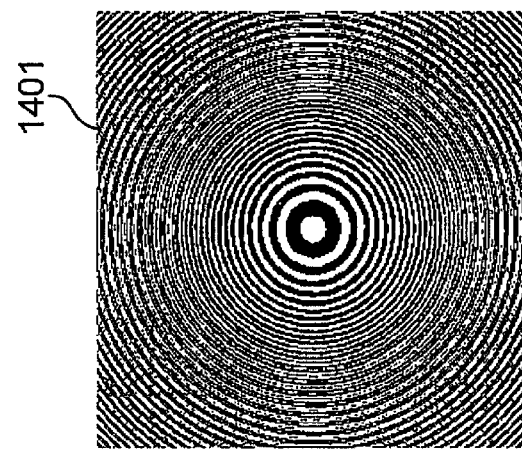

| NOISE SUPPRESSING AREA | FILTER ID |
|---|---|
| UPPER RIGHT | 1 |
| CENTER | 2 |
| ... | |

401 402

501 502

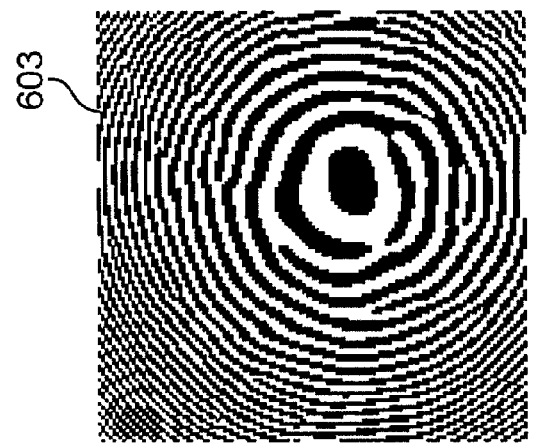
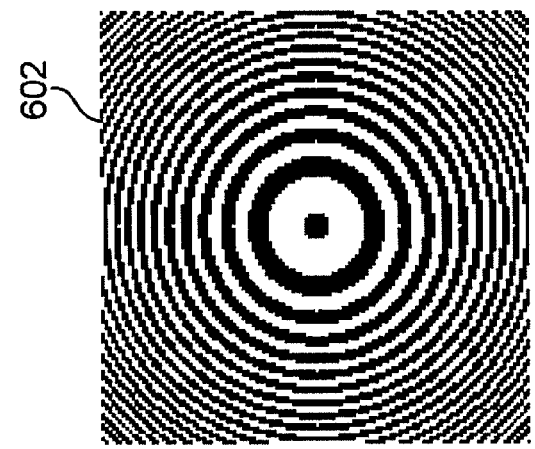
PRIOR ART
FIG. 36
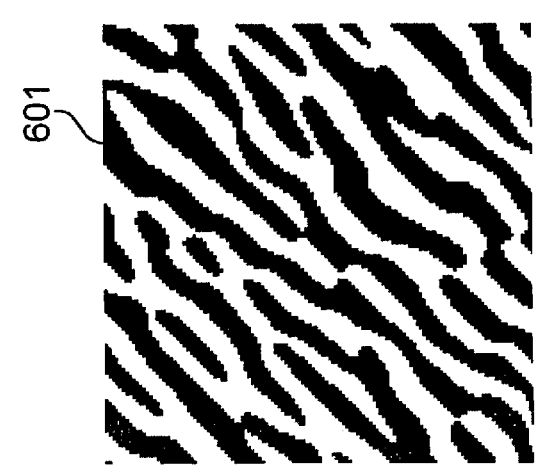

PRIOR ART
FIG.37
| 0 | 0 | 0 |
|---|---|---|
| 0 | 0 | 7/16 |
| 3/16 | 5/16 | 1/16 |
PRIOR ART
FIG.38
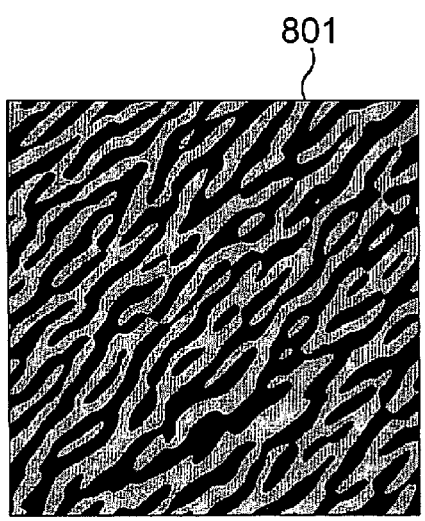
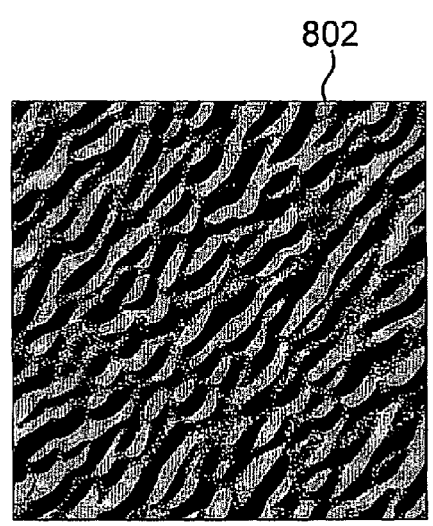

COMPUTER GENERATED HOLOGRAM TYPE DISPLAY DEVICE

CROSS-REFERENCE TO RELATED APPLICATIONS

This application claims the benefit of priority to Japanese Patent application No. 2012-088972 filed on Apr. 10, 2012, the entire content of which is hereby incorporated herein by reference.

TECHNICAL FIELD

The present application relates to a display device, such as a head-mounted display, which displays information by diffracting laser light using a diffraction pattern generated by a computer generated hologram.

BACKGROUND ART

A head-mounted display (hereafter "HMD") is a device that displays information to a user in a state of being mounted on the head of the user. In terms of mounting on the head, generally it is preferable that the HMD is compact and light, but in terms of display performance, it is preferable that the screen is large and image quality is high. In conventional HMDs, there is a method of optically magnifying an image displayed on a compact liquid crystal panel or the like using a convex lens, a free-form surface prism or the like, so that an expanded fictive image is displayed to the user (e.g. see Japanese Patent Unexamined Publication No. H8-240773). This method of magnifying images with a prism is called an "optical magnification method" in this specification.

In a display device using a computer generated hologram (hereafter "CGH"), a diffraction pattern, which is calculated by a computer using an image to be displayed as input data, is displayed on a phase modulation type liquid crystal panel as a CGH, and laser light is irradiated onto the liquid crystal panel and is diffracted, whereby the wavefront of the display light from the fictive image position is reproduced, and the fictive image is displayed to the user (e.g. see Japanese Translation of PCT Application No. 2008-541145). According to the display device with a CGH, it is possible to omit a prism and the like which have been required in the conventional HMD with an optical magnification method for magnifying images. Hence, it becomes possible to realize a more compact and lighter HMD by reducing the size of the optical system.

A method of displaying an image using CGH is briefly described hereinafter. In the display device of CGH method, a diffraction pattern is computed from an image to be displayed. In general, in computing a diffraction pattern, a method is used such as generating a diffraction pattern from an image to be displayed to the user (hereafter "original image") using a generation method based on a point filling method or a Fourier transform.

FIG. 34 is a diagram showing examples of an original image and a diffraction pattern computed from the original image. In FIG. 34, the original image 401 is an example of an original image, and the diffraction pattern 402 is an example of a diffraction pattern generated from the original image 401. This diffraction pattern 402 is displayed on a phase modulation type liquid crystal panel or the like as a CGH, and a diffraction light is generated by illuminating the liquid crystal panel with laser light. Consequently, the user can visually recognize the original image 401, based on which the diffraction pattern 402 is generated, as a diffraction light from the diffraction pattern 402 on the liquid crystal panel.

Next, an example of a computation method to generate a diffraction pattern using the point filling method will be described. In the case of the point filling method, an original image (object) is regarded as a set of point light sources, and a diffraction pattern is computed from a phase when the light from each point light source overlaps at each point on the liquid crystal panel.

FIG. 35 is a diagram depicting an example of a positional relationship between an original image 501 and a liquid crystal panel 502 that displays a diffraction pattern on generating the diffraction pattern. In order to generate the diffraction pattern to be displayed on the liquid crystal panel 502 using the point filling method, each point (each pixel) on the original image 501 is regarded as a point light source, as described above. If a point i on the original image 501 has an amplitude $a_i$ and a phase $\phi_i$, a complex amplitude of the light generated from this point i, observed at a point u on the liquid crystal panel 502, is given by the following Expression (1).

$$u_i(\xi, \eta) = \frac{a_i}{r_i}\exp\{-j(kr_i + \phi_i)\} \qquad (1)$$

Further, $r_i$ in Expression (1) denotes a distance between the point i and the point u, and $r_i$ is computed by the following Expression (2), where the origin is the center of the liquid crystal panel 502, the coordinates of the point i are $(x_i, y_i, z_i)$, and the coordinates of the point u are $(\xi, \eta, 0)$.

$$r_i = \sqrt{(\xi-x_i)^2+(\eta-y_i)^2+z_i^2} \qquad (2)$$

Further, k in Expression (1) denotes a wave number, and is given by $k=2\pi/\lambda$, where $\lambda$ denotes a wavelength of the light from the point i. The complex amplitude of the light from the point i is determined at the point u by the computation using Expression (1). Hence, the same computation is performed at each point on the original image 501, and the results are added, whereby the value of the complex amplitude at the point u on the liquid crystal panel 502 can be determined. It is to be noted that the phase value of the point i is given by adding random phase values to the original image 501. Expression (3) is an expression to indicate a complex amplitude at the point u.

$$u(\xi, \eta) = \sum_{i=1}^{N} u_i(\xi, \eta) \qquad (3)$$

In the point filling method, a diffraction pattern is generated by performing computation of Expression (3) for each point on the liquid crystal panel 502. In this example, a phase variation, by a reference light, or the like is not illustrated to simplify description. As described above, by computing a diffraction pattern using the point filling method, it becomes possible to reproduce a wavefront of a display light from an arbitrary object. Therefore, a position of a reconstructed image (fictive image) can be controlled, even without such an optical component as a prism, as in the case of the conventional optical magnification method.

One of the problems of the CGH method is the computing volume of a diffraction pattern. In the case of the point filling method, the computing volume dramatically increases depending on the number of pixels of the original image and the number of pixels of a liquid crystal panel to display a diffraction pattern. Therefore, a proposed technique is computing a diffraction pattern using an approximation for a distance between a point on an object and a point on a liquid crystal panel, and performing inverse Fourier transform on data generated by assigning a random phase value to each pixel of the original image data (e.g. Japanese Patent Publication No. 4795249). In a case where the number of pixels of original image data is N×N and the number of pixels of a diffraction pattern is N×N, an order of the computation of the point filling method is the fourth power of N, but with a technique to use inverse Fourier transform, an order of the computation is reduced to a square of (N×log N).

However, in a case where a diffraction pattern is computed by inverse Fourier transform and the like, in order to reduce computation volume, it becomes difficult to freely set a position of a reconstructed image (distance from the liquid crystal panel) by CGH, since approximation is used for computing the distance between the object (original image) and the liquid crystal panel. As a rule, in a case where a diffraction pattern is computed by inverse Fourier transform and a liquid crystal panel for displaying a diffraction pattern as a CGH is illuminated with parallel light, a reconstructed image by CGH is reconstructed based on the assumption that this image is located at infinity from the liquid crystal panel. A method that can be used for solving this problem is performing further computation for correcting the computation result based on inverse Fourier transform.

FIG. 36 shows an example of a diffraction pattern correction. A diffraction pattern 601 is a basic diffraction pattern generated by performing inverse Fourier transform on an original image. In a case where this basic diffraction pattern 601 is displayed on a liquid crystal panel, the reconstructed image is reconstructed in a position at infinity. A correction pattern 602 is a correction pattern for correcting the position of the reconstructed image of the basic diffraction pattern 601. In the case of FIG. 36, the correction pattern 602 is generated by computing a phase in the case when the wavefront of the spherical wave from the point light source, which is virtually disposed in a position to display the reconstructed image, enters the liquid crystal panel.

A composite diffraction pattern 603 is a diffraction pattern generated by superposing the basic diffraction pattern 601 and the correction pattern 602. In a case where the composite diffraction pattern 603 is displayed on the liquid crystal panel, the position of the reconstructed image becomes the position of the point light source that was used for generating the correction pattern 602. The computation cost to superpose the correction pattern 602 on the basic diffraction pattern 601 is sufficiently low, compared with the case of the point filling method or the like. Therefore, using this technique makes it possible to control the position of the reconstructed image while computing the diffraction pattern at high-speed.

Another problem of a CGH type display device is quantization noise. Generally, in a case where a diffraction pattern is computed using the point filling method or inverse Fourier transform after adding a random phase value to each pixel of an original image, each pixel of the diffraction pattern is represented by a complex number having a phase in the range from 0 to 2π. However, in a case where the liquid crystal panel can express only specific phase values, data of each pixel of the diffraction pattern must be quantized to a CGH that can be displayed on the liquid crystal panel.

For example, in a case of using a liquid crystal panel constituted by ferroelectric liquid crystals, phase values that can be expressed by this liquid crystal panel are limited to 0 or π. Therefore, in displaying a diffraction pattern as CGH on the liquid crystal panel, a value of each pixel must be binarized to 0 or π. In a case where this kind of quantization is performed, the information volume of the original diffraction pattern is diminished. As a result, a noise called "quantization noise" is generated in the reconstructed image based on CGH.

A method used for handling this problem is suppressing the noise generation by applying an error diffusion technique when the diffraction pattern computed from the original image is quantized to the phase values that can be displayed on the liquid crystal panel (e.g. Estimation of optimal error diffusion for computer-generated holograms, Ken-ichi Tanaka, Teruo Shimomura Kyushu Institute of Technology (Japan) Proc. SPIE 3491, 1998 International Conference on Applications of Photonic Technology III: Closing the Gap between Theory, Development, and Applications, 1017 (Dec. 4, 1998); doi: 10.1117/12.328674). Here, error diffusion is a technique to disperse error generated during quantization (difference between a pixel value before quantization and a pixel value after quantization) into peripheral pixels. The amount of errors to be dispersed to the peripheral pixels differs depending on the error diffusion technique, but a technique to perform weighting as shown in FIG. 37, for example, has been proposed (Floyd-Steinberg method).

FIG. 37 shows an example of the error diffusion coefficients used for error diffusion. FIG. 37 shows a 3×3 matrix of which center is a quantization pixel, where the quantization is performed. According to FIG. 37, $7/16$ of the error is added to the pixel located to the right of the quantization pixel, and $5/16$ of the error is added to the pixel located below the quantization pixel. By propagating the error to peripheral pixels like this, the generated noise can be concentrated to a high frequency area.

FIG. 38 shows an example of a diffraction pattern of which error diffusion was performed and an example of a diffraction pattern of which error diffusion was not performed, during quantization. In FIG. 38, a diffraction pattern 801 is an example of a diffraction pattern after quantization when error diffusion was not performed, and a diffraction pattern 802 is an example of a diffraction pattern after quantization when error diffusion was performed. By performing error diffusion, the quantization noise can be concentrated to a high frequency area of CGH. In the reconstructed image, the high frequency area of CGH corresponds to the edge portions of the display screen. Therefore, the quantity of the quantization noise on the entire display screen does not change depending on whether error diffusion is performed, but the generation of the quantization noise at the center portion of the display screen can be suppressed by error diffusion.

In this way, in a CGH type display device, methods for improving image quality by optimizing the position of a reconstructed image (fictive image) and suppressing the quantization noise, while keeping computation volume low, are now under research.

SUMMARY

In improving the image quality in a CGH type display device however, there is a problem that it becomes difficult to improve the image quality of the entire reconstructed image.

As described above, in the case of using the method of adding a correction pattern of a spherical wave, to adjust the position of the reconstructed image, to a diffraction pattern calculated by inverse Fourier transform, the reconstructing position at the center of the screen of the reconstructed image is optimized. However, distortion is generated at the edges of the screen, and the reconstructing positions at the edges of the screen of the reconstructed image are shifted from the optimum positions, which may cause the image quality of the reconstructed image to drop at the edges of the screen.

In the case of the method of reducing the quantization noise using the error diffusion method, the quantization noise in an area of the reconstructed image corresponding to the low frequency components of the diffraction pattern (center portion of the reconstructed image) can be suppressed. But the quantization noise rather increases at the edges of the screen of the reconstructed image.

Depending on the content of the reconstructed image displayed to the user, the image quality of the reconstructed image at the edge of the screen, rather than at the center of the screen, may need to be improved (e.g. a case displaying a mail notification icon at the edge of the screen that does not interrupt the line of sight). In the case of conventional technology, however, it is difficult to improve image quality in such a case. But solving this problem cannot be avoided as the viewing angle of a reconstructed image displayed on the CGH type display device becomes wider.

On the other hand, in the CGH type display device, not only improvement of the image quality but also widening the viewing angle of the reconstructed image (fictive image) is demanded, so that the user can view the reconstructed image easily. However, each document mentioned above does not describe how to widen the viewing angle of the fictive image, and accordingly, widening the viewing angle of the fictive image remains a difficult problem.

An aspect of the present application is for solving these conventional problems, and an object thereof is to provide a CGH type display device of which viewing angle of a fictive image can be widened.

A display device according to an aspect of the present application comprises: a light source that outputs laser light; an illumination optical system that emits the laser light as illumination light; a diffraction pattern generation unit that generates a diffraction pattern from an original image; a spatial modulation element that is illuminated by the illumination light, diffracts the illumination light by displaying the diffraction pattern to generate diffracted light, and displays the original image to a user as a fictive image by causing the user to visually recognize the generated diffracted light; and a shielding unit that is disposed on an optical path of the diffracted light, and has a first partial area and a second partial area adjacent to the first partial area, wherein the shielding unit is configured so as to selectively enter one of a plurality of states including a first state where the first partial area is a transmitting area that transmits the diffracted light and where the second partial area is a shielding area that shields the diffracted light, and a second state where the first partial area is the shielding area and where the second partial area is the transmitting area, the spatial modulation element displays the fictive image on a first display area corresponding to the first partial area when the shielding unit is in the first state, and displays the fictive image in a second display area corresponding to the second partial area when the shielding unit is in the second state, and the diffraction pattern generation unit generates a first portion diffraction pattern from an image in an area corresponding to the first display area out of the original image when the shielding unit is in the first state, and generates a second portion diffraction pattern from an image in an area corresponding to the second display area out of the original image when the shielding unit is in the second state.

According to an aspect of the present application, a CGH type display device, which can widen the viewing angle of a fictive image to be displayed to the user, can be provided.

BRIEF DESCRIPTION OF DRAWINGS

FIG. 10 shows an example of a difference among correction patterns depending on a position of the specific area;

FIG. 36 shows an example of correcting a diffraction pattern;

FIG. 37 shows an example of error diffusion coefficients used for error diffusion; and FIG. 38 shows an example of a diffraction pattern generated with performing error diffusion and an example of a diffraction pattern generated without performing error diffusion, during quantization.

DETAILED DESCRIPTION

Figure 1:
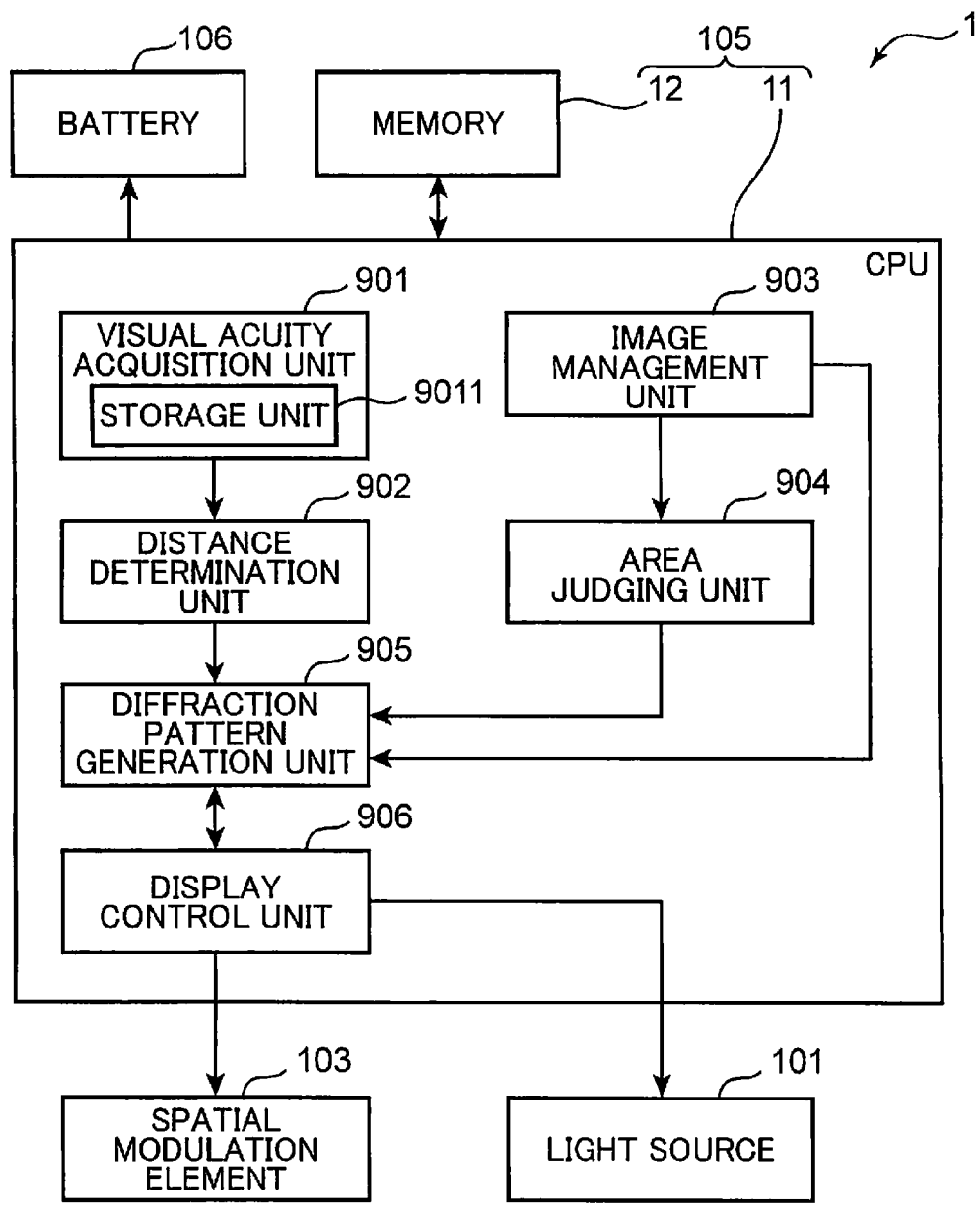
FIG. 1 shows an example of functional blocks of a display device according to Embodiment 1.

In the following, an embodiment of an aspect of the present disclosure will be described referring to the drawings. The following embodiment is an example embodying an aspect of the present disclosure, and does not limit the technical range of an aspect of the present disclosure.

Embodiment 1

Figure 2:
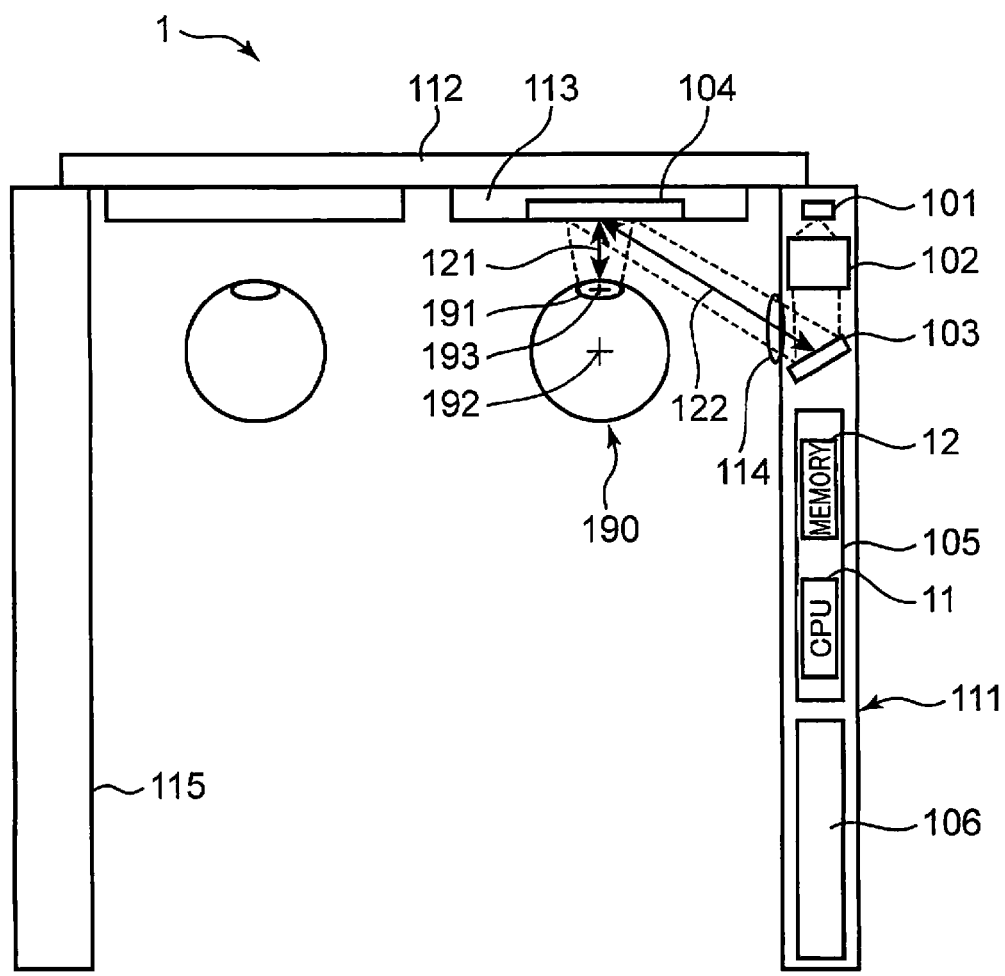
FIG. 2 is a diagram depicting a configuration of the display device according to Embodiment 1.

FIG. 1 is a functional block diagram of a head-mounted display device (HMD) 1 according to Embodiment 1. FIG. 2 is a schematic diagram depicting a configuration of the display device 1 shown in FIG. 1. As shown in FIG. 2, the display device 1 of Embodiment 1 has a shape like spectacles, and FIG. 2 is a top view. The configuration of the display device 1 according to Embodiment 1 will now be described with reference to FIG. 1 and FIG. 2.

A light source 101 is a laser light source that outputs laser light. In Embodiment 1, a semiconductor laser (laser diode) that outputs laser light having a green wavelength is used as the light source 101. As the light source 101, a single color of red or blue may be used instead, or three colors of red, green and blue may be multiplexed for color display, or the three colors of red, green and blue may be driven by time-division driving to implement color display. As the light source 101, a laser other than a semiconductor laser may be used instead, or a combination of a semiconductor laser and another laser may be used. As the light source 101, a combination of an infrared light semiconductor laser and a second harmonic generation (SHG) element for converting infrared light into green light may also be used.

An illumination optical system 102 emits the laser light from the light source 101 as an illumination light generated by, for example, changing a wavefront form or intensity distribution thereof. In Embodiment 1, a convex lens for converting the laser light from a diffused light into a converged light, and a neutral density (ND) filter for attenuating intensity of the laser light are used as the illumination optical system 102. The element for changing the wavefront form of the illumination light may be a lens or a mirror, or an element that can change dynamically, such as a liquid crystal lens. The illumination optical system 102 may include an optical system for changing the intensity distribution. The illumination optical system 102 may also include a filter to remove an undesired illumination light.

A spatial modulation element 103 diffracts an illumination light from the illumination optical system 102 by displaying a diffraction pattern, so that the user can visually recognize a display image. In Embodiment 1, a phase modulation type reflective liquid crystal panel is used as the spatial modulation element 103. The spatial modulation element 103 may be a different display element only if an illumination light can be diffracted by displaying a diffraction pattern. A transmission panel, for example, may be used for the spatial modulation element 103. In this case, the layout of the optical system can be changed, such as disposing the light source 101 on the ear side of the spectacles.

A reflecting mirror 104 reflects a diffracted light from the spatial modulation element 103 toward an eyeball 190 of a user. In Embodiment 1, a semi-transmission Fresnel mirror is used as the reflecting mirror 104. A semi-transmission Fresnel mirror is generated by depositing a thin metal film on the Fresnel lens, and gluing the semi-transmission Fresnel mirror to a lens unit 113 on a front portion 112 with adhesive. A refractive index of the Fresnel mirror and that of the adhesive are similar so that the transmitted light can propagate linearly, and the outside world viewed through the lens unit 113 is not distorted. The HMD, in which the user directly views the spatial modulation element 103 without using the reflecting mirror 104, may be used. The reflecting mirror 104 may be a lens type or may be implemented using a diffraction grating such as a hologram. When the reflecting mirror 104 is constructed by a hologram, a see-through display that is slimmer and has higher transmittance can be constructed.

The eyeball 190 illustrates an eyeball at an assumed eyeball position of the display device 1 of Embodiment 1. The assumed eyeball position is a position where the eyeball is assumed to be located when the user is mounting the display device 1 on the head. In Embodiment 1, the assumed eyeball position is a pupil center 193 of a pupil 191 of the eyeball 190 when the user is mounting the display device 1. The diffracted light reflected by the reflecting mirror 104 forms an image on a retina, via the pupil 191 of the eyeball 190 located at the assumed eyeball position, and displays an image to the user. An eyeball center 192 in FIG. 2 is a center position of the eyeball 190, and is also a rotation center of the eyeball 190. The assumed eyeball position may be slightly shifted from the pupil center 193. The assumed eyeball position may be the eyeball center 192, instead of the pupil center 193.

When the user mounts the display device 1 shown in FIG. 2 on the head (that is, hooks a temple unit 111 over the ears), the positional relationship between the spatial modulation element 103 and the assumed eyeball position is fixed. An allowable error may be set for the assumed eyeball position or a function to adjust the assumed eyeball position may be provided, considering the difference of the position of the eyeball 190 with respect to the head area depending on the respective user or the shift of the display device 1 during mounting.

A control unit 105 drives the light source 101 and causes the spatial modulation element 103 to display a diffraction pattern. The control unit 105 turns the light source 101 on and off, and adjusts the intensity of the laser light outputted by the light source 101 so that an appropriate light quantity enters the eyeball. The control unit 105 may drive the three colors of laser light sources by time-division, and display diffraction patterns corresponding to the three colors respectively on the spatial modulation element 103 synchronizing with the light sources 101, so as to perform color display. The control unit 105 may control a battery 106, or may control the illumination optical system 102 and the reflecting mirror 104, in a case where these elements are controllable.

In Embodiment 1, the control unit 105 includes a CPU 11 and a memory 12, and performs a generation control of a diffraction pattern in accordance with a content of a fictive image to be displayed. The CPU 11 includes a visual acuity acquisition unit 901, a distance determination unit 902, an image management unit 903, an area judging unit 904, a diffraction pattern generation unit 905, and a display control unit 906 as functional blocks. The memory 12 stores programs. The memory 12 also temporarily stores data. The CPU 11 implements each of the above mentioned functional blocks by executing programs stored in the memory 12. The function of each functional block in FIG. 1 will be described later.

The battery 106 supplies power to each component of the display device 1, such as the control unit 105 and the spatial modulation element 103. The battery 106 of Embodiment 1 is a rechargeable type, and is charged when the display device 1 is not mounted on the user. The battery 106 is disposed near the end of a temple portion 111 on the ear side, so that the weight balance as an entire device is more toward the ear side, whereby the slipping down of the front portion 112 can be minimized. The battery 106 need not be a rechargeable type, and power may be supplied when the display device 1 is in use. Power may be supplied to the display device 1 from the outside, or the display device 1 may have a generating unit.

The display device 1 in the shape of spectacles shown in FIG. 2 is constituted by the temple portion 111 that is positioned on the side of the head, and the front portion 112 that is positioned in front of an eye. The light source 101, the illumination optical system 102, the spatial modulation element 103, the control unit 105 and the battery 106 are disposed in the temple portion 111. An emitting window 114 is disposed in the temple portion 111 so that the diffracted light from the spatial modulation element 103 is emitted to the reflecting mirror 104.

The front portion 112 includes the lens unit 113, and the reflecting mirror 104 is disposed in a part (front surface or inside) of the lens unit 113. The reflecting mirror 104 of Embodiment 1 transmits the outside view while reflecting the display light, but the reflecting mirror 104 may be configured such that the outside view is not transmitted. The front portion 112 and the temple portion 111 may be folded in order to improve portability. In this case, the folding position may be the edge of the temple portion 111 or the ear side with respect to the spatial modulation element 103. The lens unit 113 may be a lens for near sightedness, just like the case of a regular spectacle lens, or may be a lens for correcting far sightedness or astigmatism. The lens unit 113 may have a function to drop transmittance just like sunglasses, or may have a polarizing function. The lens unit 113 may prevent the reflection of undesired light, or may include a film having a function to prevent contamination.

Figure 3:
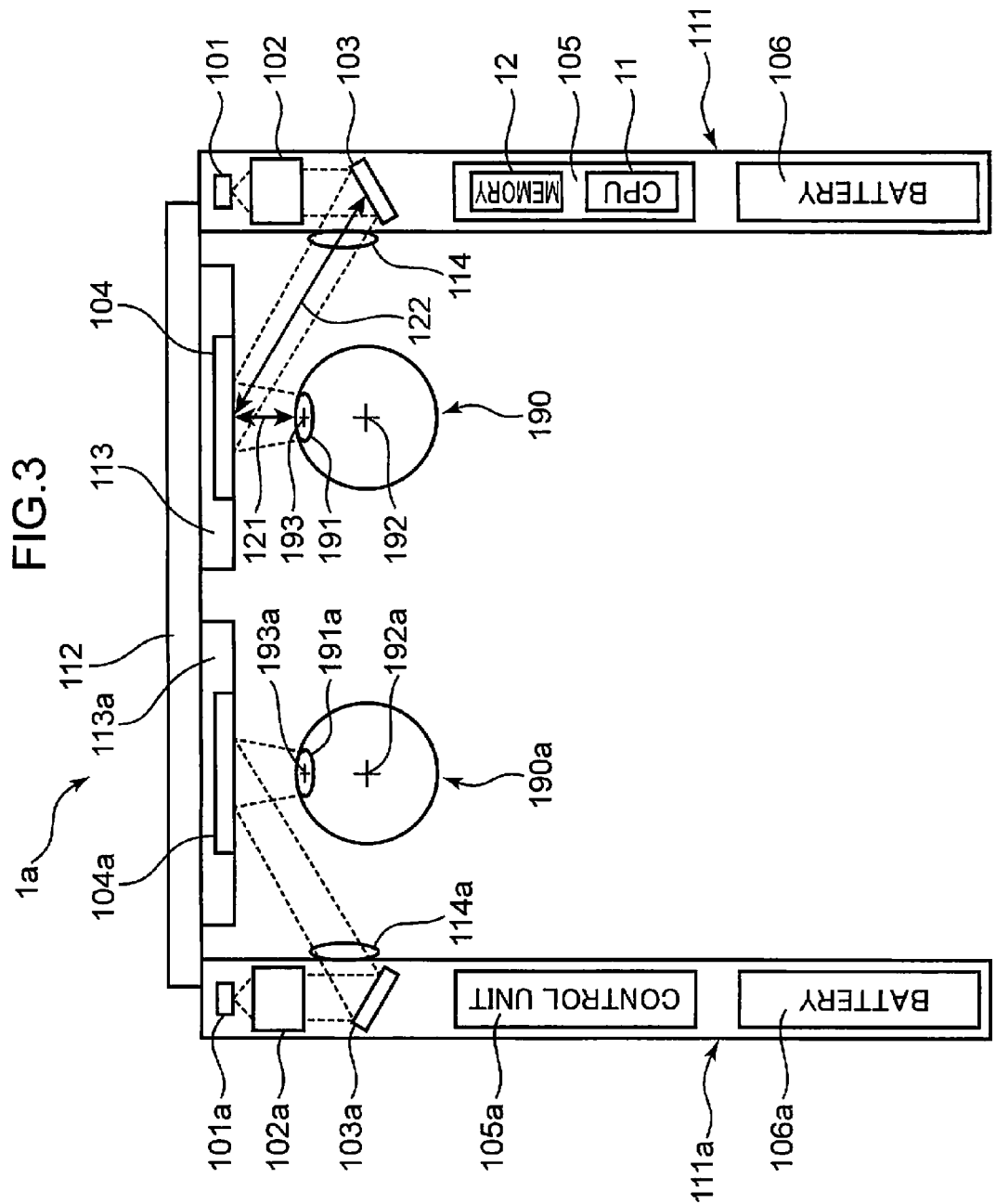
FIG. 3 is a diagram depicting another configuration of the display device.

In FIG. 2, the configuration is such that a fictive image is displayed to one eye (right eye to be specific) only, but a configuration may be such that a fictive image is displayed to both of right eye and left eye as shown in FIG. 3.

FIG. 3 is a schematic diagram depicting a configuration of a display device 1a which displays a fictive image for both the right and left eyes. In the display device 1a of FIG. 3, the same composing elements as the right eye portion are disposed for the left eye portion. Each composing element of the left eye portion of the display device 1a is denoted with a same reference numeral of the corresponding composing element of the right eye portion, but with additional character "a". Each composing element of the left eye portion has a same function as the corresponding composing element of the right eye portion. The left eye portion and the right eye portion need not have all the composing elements. For example, the control unit 105 may be disposed only for the right eye portion, and the control unit 105a may be omitted for the left eye portion, so that the control unit 105 of the right eye portion simultaneously controls the display for both the right eye and the left eye. In this case, the number of components of the display device 1a is decreased, and the cost and weight of the display device 1a can be reduced.

The distance denoted with the reference numeral 121 in FIG. 2 indicates a distance from the assumed eyeball position of the user (pupil center 193 in this embodiment, as described above) to the reflecting mirror 104. The distance denoted with the reference numeral 122 in FIG. 2 indicates a distance from the reflecting mirror 104 to the spatial modulation element 103. In this description, the sum of the distance 121 and the distance 122 is called a distance (or an optical axis distance) from the assumed eyeball position to the spatial modulation element 103.

Figure 4:
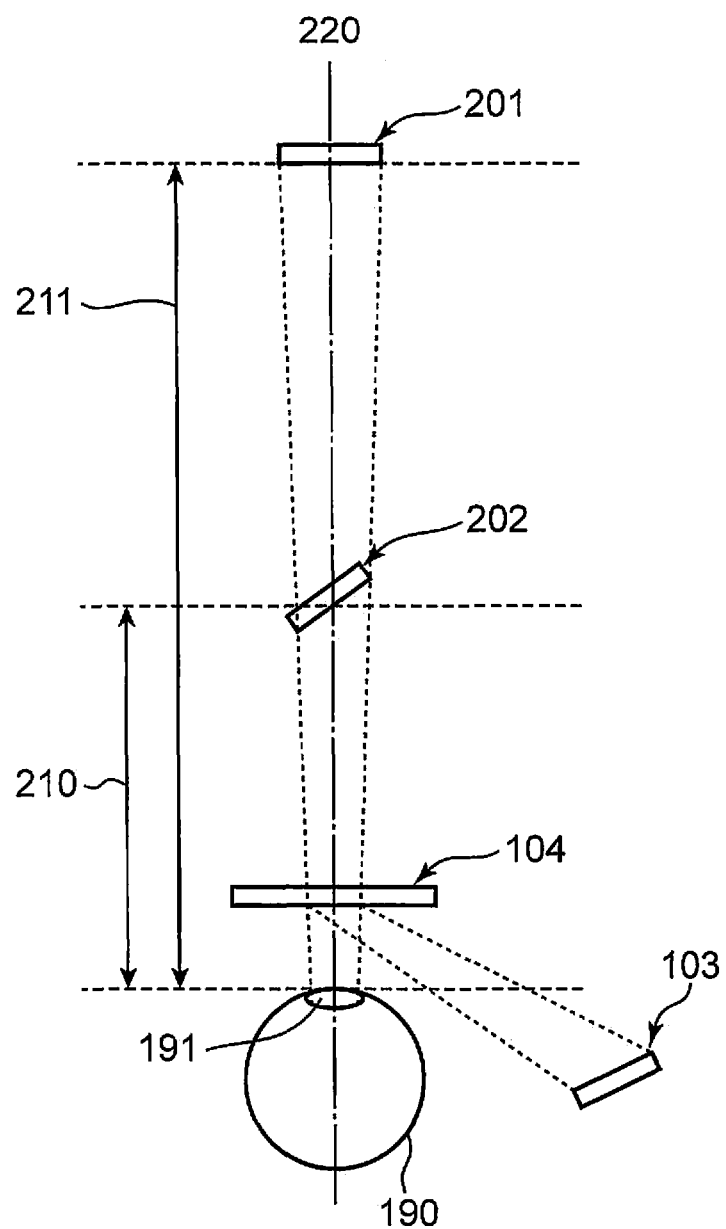
FIG. 4 is a diagram depicting a positional relationship of an eyeball and the like in Embodiment 1.
Figure 5:
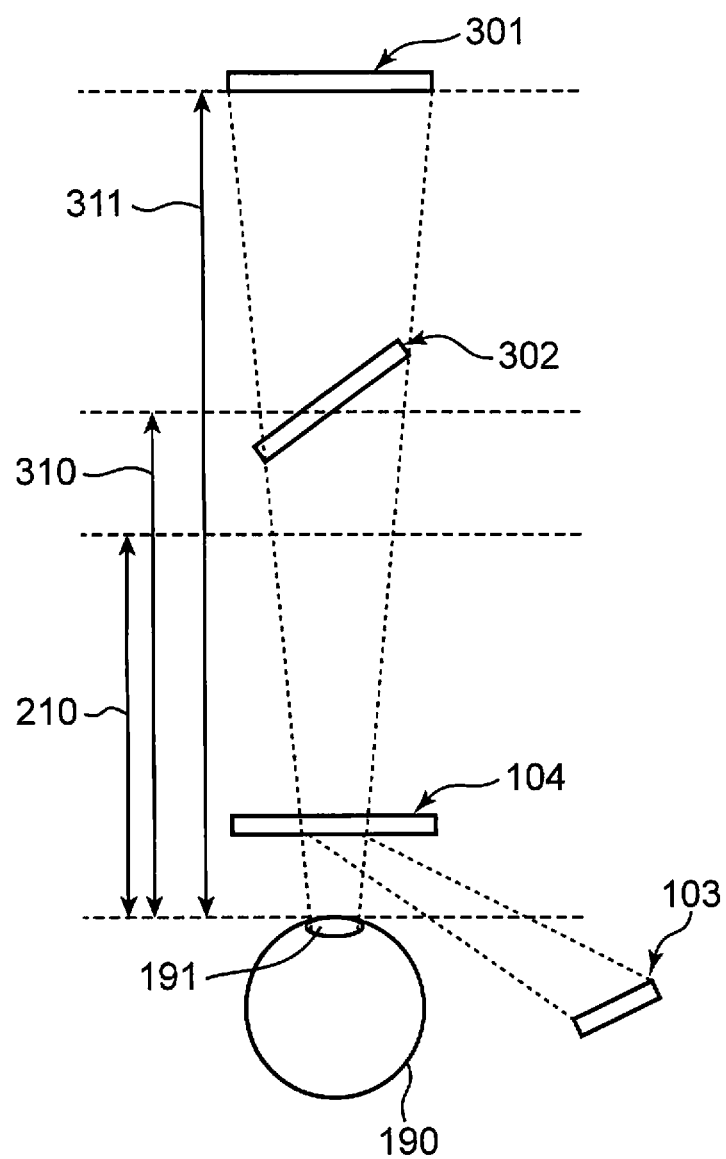
FIG. 5 is a diagram depicting a positional relationship of an eyeball and the like in Embodiment 1.

FIG. 4 and FIG. 5 are diagrams depicting a positional relationship of the eyeball 190, the reflecting mirror 104, the spatial modulation element 103, a reconstructed image (fictive image) generated by a diffraction pattern, and the like.

The eyeball 190, the reflecting mirror 104 and the spatial modulation element 103 are disposed as shown in FIG. 4. In a case where the optical magnification of the reflecting mirror 104 is "1", a virtual image 202 of the spatial modulation element 103 is located at a position shown in FIG. 4. The distance from the pupil center 193 (FIG. 2) of the eyeball 190 to the virtual image 202 is equal to the "distance 210 up to the spatial modulation element 103", that is, a sum of the distance 121 (FIG. 2) from the pupil center 193 (FIG. 2) of the eyeball 190 to the reflecting mirror 104 and the distance 122 (FIG. 2) from the reflecting mirror 104 to the spatial modulation element 103. In the example in FIG. 4, the spatial modulation element 103 is diagonally disposed with respect to the optical axis 220, and the distance in this case is a distance based on the center point of the spatial modulation element 103 as a reference point. A point other than the center may be used as the reference point.

In a case where the optical magnification of the reflecting mirror 104 is greater than "1" as shown in FIG. 5, a virtual image 302 of the spatial modulation element 103 is located at a position shown in FIG. 5. The distance 310 from the pupil center 193 (FIG. 2) of the eyeball 190 to the virtual image 302 of the spatial modulation element 103 is longer than the above-mentioned "distance 210 up to the spatial modulation element 103", and the virtual image 302 is larger than the virtual image 202.

Figure 34:
FIG. 34 shows examples of an original image and a diffraction pattern.
Figure 35:
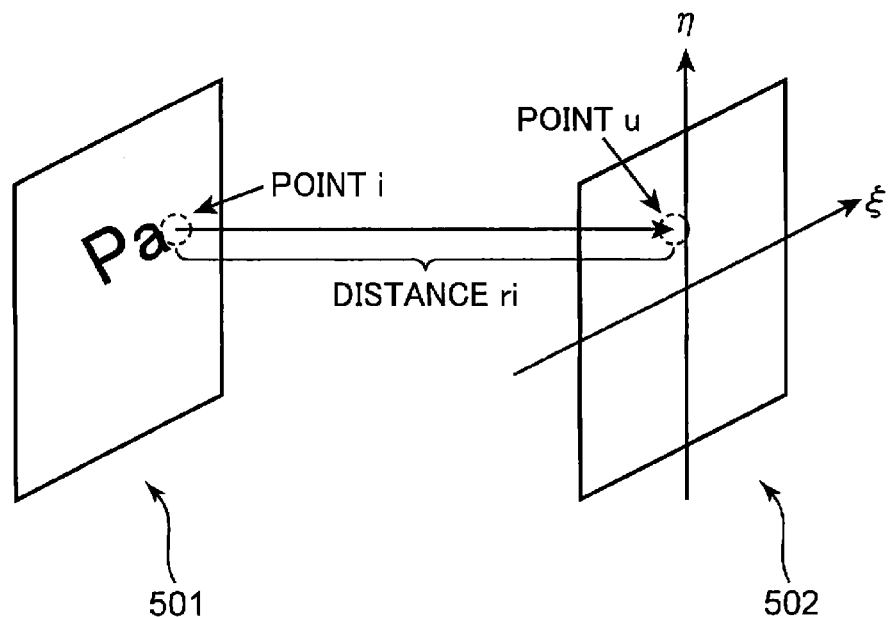
FIG. 35 shows an example of a positional relationship between an original image and a liquid crystal panel.

By displaying a diffraction pattern (e.g. the diffraction pattern 402 shown in FIG. 34) on the spatial modulation element 103, the user can visually recognize the fictive image 201 in FIG. 4 and the fictive image 301 in FIG. 5 (e.g. the original image (fictive image) 401 shown in FIG. 34). The distance 211 or 311 up to the fictive image can be changed by computation of the diffraction pattern. Therefore, the distance from the eyeball 190 to the fictive image can be appropriately adjusted according to the visual acuity of the user.

A part of functions of respective units of the display device 1 indicated in this embodiment may be implemented by a device that is different from the main body of the display device 1. Further, a function not indicated in this embodiment may be included in the display device 1. Functions may be divided into the main body of the display device 1, and a mobile terminal that is separate from the main body of the display device 1. Functions may also be separated into the display device 1, and a network server. The control unit 105 of the display device 1 may compute a diffraction pattern as in this embodiment. Alternatively, the display device 1 may acquire a diffraction pattern calculated in an external device. Further alternatively, an external device may perform a part of the computation of a diffraction pattern, and the display device 1 may perform the remainder of the computation. Further, in this embodiment, the light source 101 may be disposed in an external device, and the light outputted from the light source 101 may be transmitted via an optical fiber. The battery 106 may be disposed in an external device, and a power cord may be connected to the display device 1. Further, the display device 1 may include a camera, various sensors for angular velocity, temperature, GPS or the like, an input device such as a switch, and an output device such as a speaker, as other functions. The above-described modification may be applied to the embodiments to be described later.

By displaying a diffraction pattern on the spatial modulation element 103 using the CGH type display device 1 shown in FIG. 1 and FIG. 2 in this way, a fictive image can be generated at a position far from the eyeball 190 of the user without increasing the size of the illumination optical system 102 or the like.

Figure 6:
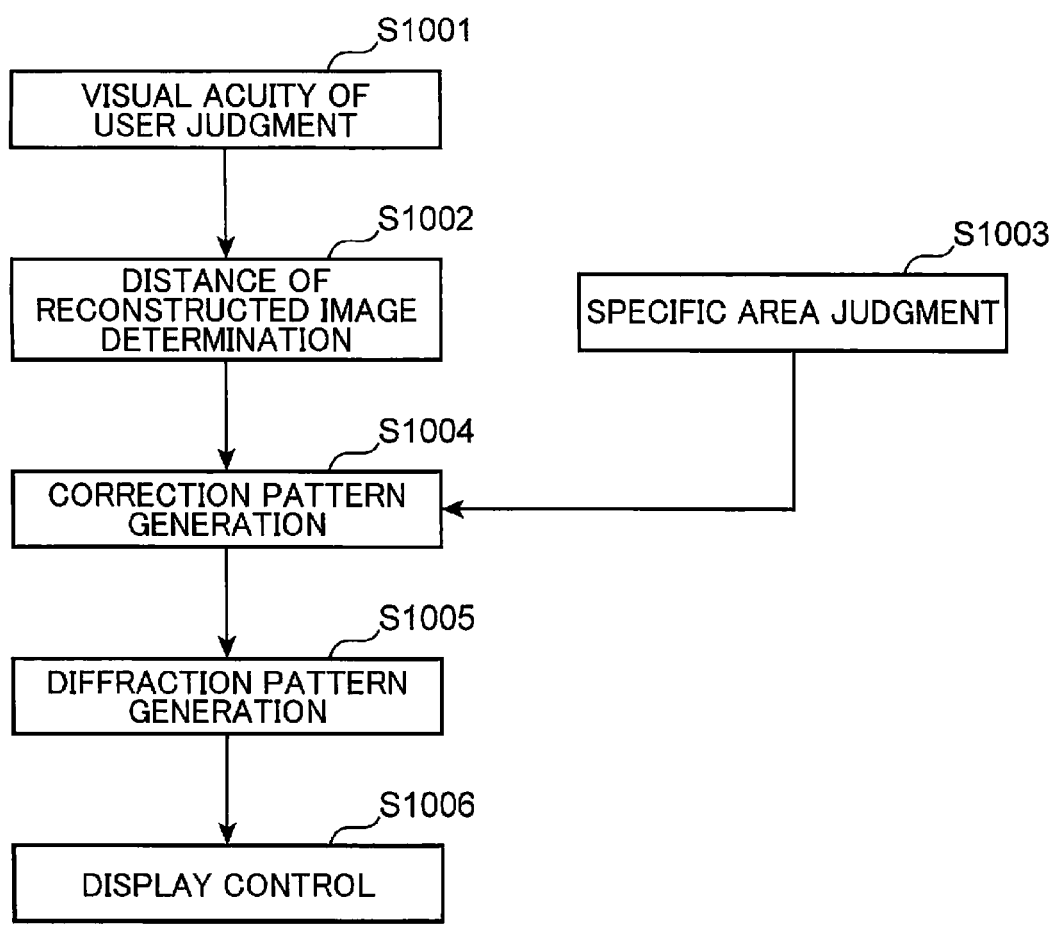
FIG. 6 is a flow chart depicting an operation according to Embodiment 1.

FIG. 6 is a flow chart depicting an operation according to Embodiment 1. An example of generating a diffraction pattern corresponding to the display content according to Embodiment 1 will be described with reference to FIG. 1 and FIG. 6. In Embodiment 1, the control unit 105 controls the generation and display of a diffraction pattern by performing processing in steps S1001 to S1006 shown in FIG. 6.

<Step S1001> (Visual Acuity of User Judgment)

In step S1001, the visual acuity acquisition unit 901 included in the control unit 105 acquires information on the visual acuity of the user of the display device 1. In Embodiment 1, the visual acuity acquisition unit 901 has a storage unit 9011 for storing information on the visual acuity of the user. In this step S1001, the visual acuity acquisition unit 901 notifies information on the visual acuity of the user, acquired from the storage unit 9011, to the distance determination unit 902.

The configuration to store the visual acuity of the user to the storage unit 9011 of the visual acuity acquisition unit 901 is not limited to a specific configuration. For example, an input unit to input information may be disposed in the display device 1, so that visual acuity information can be input through this unit. In this case, the user can easily change the visual acuity information. A configuration may be used to save visual acuity information of the user in the storage unit 9011 of the visual acuity acquisition unit 901 via an external apparatus, or via such an information recording device as an SD card.

The storage unit 9011 of the visual acuity acquisition unit 901 may be disposed inside the control unit 105 as in the case of Embodiment 1. Alternatively, the storage unit 9011 may exist in a different device that can communicate with the control unit 105, for example.

<Step S1002> (Distance of Reconstructed Image Determination)

Figures 7, 8:
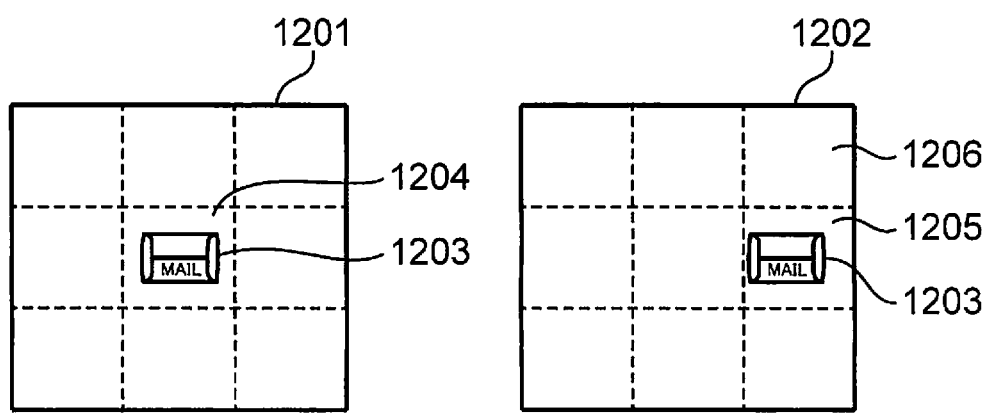
FIG. 7 shows an example of a conversion table indicating the relationship between visual acuity and the reconstructed image distance.
FIG. 8 shows examples of an original image where a position of a specific area is different.

FIG. 7 shows an example of a conversion table 9021. In step S1002, the distance determination unit 902 included in the control unit 105 determines the distance of the reconstructed image (fictive image) displayed on the display device 1 (distance from an eye ball of the user to the reconstructed image) based on the information on the visual acuity of the user acquired from the visual acuity acquisition unit 901 in the previous step S1001. The distance determination unit 902 notifies the determined distance (corresponding to an example of the optimum reconstruction position) of the fictive image to the diffraction pattern generation unit 905.

In Embodiment 1, the distance determination unit 902 has the conversion table 9021 for determining a distance of a reconstructed image based on the visual acuity of the user. As FIG. 7 shows, the conversion table 9021 indicates the relationship between the visual acuity and the distance of the reconstructed image. The distance determination unit 902 determines the distance of the reconstructed image by using the conversion table 9021.

In Embodiment 1, the distance determination unit 902 uses the conversion table 9021 for determining a distance of the reconstructed image from a numeric value on the visual acuity of the user. Alternatively, the distance determination unit 902 may determine a distance of the reconstructed image using different information. For example, the distance determination unit 902 may determine a distance of the reconstructed image based on information including information on the presbyopia of the user. In this case, the reconstructed image can be prevented from being too close to the user of which presbyopia is serious.

In determining a distance of the reconstructed image, the distance determination unit 902 may use a method other than using the conversion table 9021, such as using a function for which the visual acuity of the user is input. For example, the distance determination unit 902 may hold a distance of a reconstructed image when the visual acuity is 1.0 as the reference distance in advance, and determine a distance of the reconstructed image by multiplying the reference distance by the value of the visual acuity of the user. In this case, the storage capacity can be reduced since there is no need to hold the conversion table 9021.

<Step S1003> (Specific Area Judgment)

In step S1003, the area judging unit 904 included in the control unit 105 judges a specific area of which image quality should be optimized, out of the image to be displayed to the user.

In Embodiment 1, the image management unit 903 manages an image to be displayed to the user. The image management unit 903 holds the original image 401 shown in FIG. 34, for example, as an image to be displayed to the user. The area judging unit 904 acquires an image to be displayed to the user from the image management unit 903. The area judging unit 904 judges an area, of which image quality should be improved, as a specific area. The area judging unit 904 notifies information on the position of the judged specific area to the diffraction pattern generation unit 905. In this Embodiment 1, the area judging unit 904 judges an area where an image is displayed on the display screen (area in which a pixel value of the image is not 0) as a specific area. This example is shown in FIG. 8.

FIG. 8 shows examples of an original image, where a position of the specific area is different. The original image 1201 is an example when the image information 1203 is only at the center on the display screen. In the case of the original image 1201, the area judging unit 904 judges the center area 1204 on the display screen as the specific area. The original image 1202 is an example when the image information 1203 is only at the right side on the display screen. In the case of the original image 1202, the area judging unit 904 judges the area at the right side of the center 1205 on the display screen as the specific area.

As the method for the area judging unit 904 to judge an area where an image is displayed, such a method as image analysis may be used instead of judgment based on pixel values. For example, the area judging unit 904 may use a method of extracting a mail icon, character information or the like from an image, and judging an area where this information is displayed as the specific area. In this case, the area judging unit 904 can judge the specific area even when an image is displayed on the entire display screen (even when there is no area where the pixel value of the image is 0).

Further, the area judging unit 904 may hold a priority level based on the type of information in the area judging unit 904 in advance, and judge a specific area using this priority level. For example, the area judging unit 904 may hold a priority level for each specific image information (e.g. mail icon, icon to advise caution due to danger), and judge a specific area using this priority level. In this case, the area judging unit 904 can judge an area where information of which priority level is higher is displayed as a specific area, even when a plurality of information items are displayed on the display screen. As a result, the image quality of the area of the fictive image corresponding to the specific area can be optimized and displayed to the user.

Further, the area judging unit 904 may judge the specific area using a method other than image analysis. For example, the image management unit 903 may embed, in advance, information on the specific area in meta data attached to the image, and the area judging unit 904 may judge the specific area using this information. In this case, the area judging unit 904 need not perform image analysis or the like. Accordingly, it becomes possible to reduce the processing cost required for area judgment.

The image to be displayed to the user is not limited to a specific format, but may be a still image or may be a video image. The image to be displayed to the user may be character information such as text.

The way of indicating the result of judging the specific area is not limited to a specific format, but may be any format. In the example of Embodiment 1, the display screen is segmented into nine areas, as shown in FIG. 8, and a specific area of which image quality should be optimized is selected from the nine areas, such as the "upper right area", "right of the center area" or "center area". Alternatively, the specific area of which image quality should be optimized may be indicated by the coordinate values on the display screen. In this case, the range of optimizing the image quality can be specified in more detail.

<Step S1004> (Correction Pattern Generation)

In step S1004, the diffraction pattern generation unit 905 generates a correction pattern to be superposed on the diffraction pattern using the distance information acquired from the distance determination unit 902 and the specific area information acquired from the area judging unit 904.

In Embodiment 1, the diffraction pattern generation unit 905 determines a specific position α for generating a correction pattern according to a later described procedure. As the correction pattern, the diffraction pattern generation unit 905 computes the phase when a spherical wave, which propagates from a point light source virtually disposed at the specific position α to the spatial modulation element 103, enters the spatial modulation element 103. When the coordinates of the specific position α are ($x_i$, $y_i$, $z_i$), the wavefront (phase) of the spherical wave at a point u ($\xi$, $\eta$, 0) on the spatial modulation element 103 can be determined by Expression (1) and Expression (2). Therefore, the diffraction pattern generation unit 905 can generate a correction pattern by performing computation of Expression (1) and Expression (2) for each point on the spatial modulation element 103.

The diffraction pattern generation unit 905 determines the coordinate $z_i$ of the specific position α from the distance information acquired from the distance determination unit 902. In this Embodiment 1, the diffraction pattern generation unit 905 directly uses the distance information from the distance determination unit 902 as the value of the coordinate $z_i$. The diffraction pattern generation unit 905 determines the values of the coordinates $x_i$ and $y_i$ of the specific position α based on the position of the specific area acquired from the area judging unit 904.

In Embodiment 1, the diffraction pattern generation unit 905 holds a table where the values of the coordinates $x_i$ and $y_i$ for each position of a specific area are stored. The diffraction pattern generation unit 905 determines the values of the coordinates $x_i$ and $y_i$ according to the position of the specific area acquired from the area judging area 904. For example, in a case where the specific area is the center area, the table held by the diffraction pattern generation unit 905 may be created so that the values of the coordinates $x_i$ and $y_i$ become 0. This makes it possible to generate the correction pattern, with which the center of the display screen has an image quality matching the visual acuity of the user.

As a method of determining the coordinates $x_i$ and $y_i$, the diffraction pattern generation unit 905 may use a method other than using a table. For example, in a case where the information on the specific area acquired from the area judging unit 904 is the coordinate values, the coordinate values of the center of the specific area may be used as the values of the coordinates $x_i$ and $y_i$. In this case, the cost of holding the table can be reduced, since the diffraction pattern generation unit 905 need not use the table.

Figure 9:
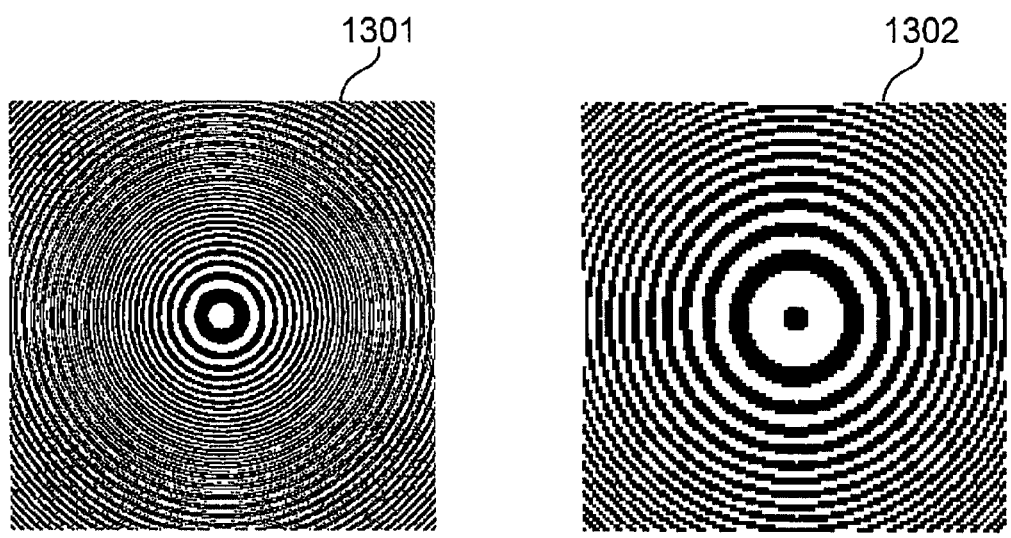
FIG. 9 shows an example of a difference between correction patterns depending on visual acuity.

FIG. 9 shows an example of a difference between correction patterns depending on visual acuity (display distance). The correction pattern 1301 is an example of a correction pattern of which value of the coordinate $z_i$ is small, and which is used for forming a reconstructed image in a position near the spatial modulation element 103. The correction pattern 1302 is an example of a correction pattern of which value of the coordinate $z_i$ is great, and which is used for forming a reconstructed image in a position distant from the spatial modulation element 103.

FIG. 10 shows an example of a difference among correction patterns depending on a position of the specific area. The correction pattern 1401 is an example of a correction pattern when the center area on the display screen (center area 1204 in FIG. 8) is the specific area. The correction pattern 1402 is an example of a correction pattern when the right of the center area on the display screen (right of the center area 1205 in FIG. 8) is the specific area. The correction pattern 1403 is an example of a correction pattern when the upper right area on the display screen (area 1206 in FIG. 8) is the specific area.

In this Embodiment 1, the diffraction pattern generation unit 905 changes the correction pattern according to the visual acuity of the user as shown in FIG. 9, and changes the correction pattern according to the position of the specific area on the display screen as shown in FIG. 10. Thereby an area of the fictive image, in which the image quality improves for the user by matching with the visual acuity of the user, can be controlled in the display screen.

In Embodiment 1, a configuration for the diffraction pattern generation unit 905 to sequentially generate a correction pattern is illustrated, but a different configuration may be used. For example, the diffraction pattern generation unit 905 may store correction patterns generated in advance, and may read out the stored correction pattern according to the distance of the reconstructed image (fictive image) and/or the position of the specific area. In this case, the computing cost to generate the correction pattern can be suppressed.

Embodiment 1 shows an example in a case where the specific position α is a single position. Alternatively, the diffraction pattern generation unit 905 may compute a correction pattern by using a plurality of specific positions, and superposing a phase of a wavefront of a spherical wave from each point light source which is virtually disposed in each specific position. In this case, image quality of a plurality of areas of the fictive image corresponding to the plurality of specific areas can be improved.

The diffraction pattern generation unit 905 may compute a correction pattern regarding the wavefront from the point light source, which is virtually disposed in the specific position α, as a wavefront of a wave other than the spherical wave. For example, the diffraction pattern generation unit 905 may use a phase pattern for correcting an aberration on the reflecting mirror 104 as a correction pattern. The diffraction pattern generation unit 905 may also use a phase pattern to correct an astigmatism of the user as a correction pattern. Or the diffraction pattern generation unit 905 may also generate a correction pattern by superposing a spherical wave from a point light source, which is virtually disposed on the specific position α, and a phase pattern for correcting an aberration of the reflecting mirror 104. In this case, a fictive image, where an aberration of the reflecting mirror 104 has been corrected, can be displayed on an appropriate position matching the visual acuity of the user or the position of the specific area. Therefore, the image quality can be more appropriately improved.

<Step S1005> (Diffraction Pattern Generation)

In step S1005, the diffraction pattern generation unit 905 generates a basic diffraction pattern from the image to be displayed to the user, and superposes the correction pattern generated in the previous step S1004 on the basic diffraction pattern, so as to generate a diffraction pattern to be used for display in the spatial modulation element 103.

In Embodiment 1, the diffraction pattern generation unit 905 acquires an image to be displayed to the user (e.g. original image 401 shown in FIG. 34) from the image management unit 903. The diffraction pattern generation unit 905 adds a random phase value in a range of 0 to $2\pi$ to each pixel of the acquired image, and then performs inverse Fourier transform, so as to generate a basic diffraction pattern. Then, the diffraction pattern generation unit 905 superposes the correction pattern generated in the previous step S1004 to the generated basic diffraction pattern, whereby a composite diffraction pattern to be displayed on the spatial modulation element 103 is generated.

In FIG. 36, the diffraction pattern 601 is an example of the basic diffraction pattern, the diffraction pattern 602 is an example of the correction pattern, and the diffraction pattern 603 is an example of the composite diffraction pattern after correction. As FIG. 36 shows, the diffraction pattern can be changed by superposing the correction pattern on the basic diffraction pattern.

In a case where the spatial modulation element 103 can display only a specific phase value, the diffraction pattern generation unit 905 performs quantization processing for a diffraction pattern which is a complex number value. For example, in a case where the spatial modulation element 103 can display only two phase values (specific phase values) of 0 or $\pi$, the diffraction pattern generation unit 905 judges whether the phase value of each pixel of the generated diffraction pattern is closer to 0 or closer to $\pi$, and performs quantization to a closer phase value. By performing quantization so that the numbers of phase 0 and phase $\pi$ match after quantization, the diffraction pattern generation unit 905 can suppress the generation of zero-order diffracted light.

The diffraction pattern generation unit 905 may perform quantization using more than two values, according to the characteristics of the spatial modulation element 103. For example, in a case where the spatial modulation element 103 can display only three phase values (specific phase values) of 0, $2/3\pi$ and $4/3\pi$, the diffraction pattern generation unit 905 judges which one of 0, $2/3\pi$ and $4/3\pi$ a phase value of each pixel of the generated diffraction pattern is close to, and performs quantization to the closest phase value. In a case where quantization is performed using three values like this, generation of quantization noise can be suppressed compared to the case of quantization using two values.

The diffraction pattern generation unit 905 may use a method other than inverse Fourier transform to generate the basic diffraction pattern. The phase value that the diffraction pattern generation unit 905 adds to the image acquired from the image management unit 903 need not be random. The diffraction pattern generation unit 905 may adjust the phase value to add, so that the phases of the adjacent pixels differ 90°, for example. According to this configuration, when a laser light source is used for the light source 101, interference between adjacent pixels can be suppressed, and generation of speckle noise can be suppressed.

The diffraction pattern generation unit 905 notifies the generated diffraction pattern to the display control unit 906.

<Step S1006> (Display Control)

In step S1006, the display control unit 906 performs processing to display the diffraction pattern, generated by the diffraction pattern generation unit 905 in the previous step S1005, on the spatial modulation element 103.

In Embodiment 1, the display control unit 906 controls the modulation amount of the spatial modulation element 103, which is a reflection type liquid crystal panel, so that the spatial modulation element 103 can express the phase values of the diffraction pattern. The display control unit 906 controls the output of the light source 101 so that the output corresponds to the wavelength of the diffraction pattern the spatial modulation element 103 displays. In other words, the diffraction pattern displayed by the spatial modulation element 103 has wavelength dependency. Therefore, in a case where the light source 101 outputs three colors of red, green and blue, the display control unit 906 controls the output of the light source 101 to an appropriate value according to the color that is outputted from the light source 101. Step S1006 implements display of the reconstructed image (fictive image) to the user, using the diffracted light from the spatial modulation element 103 that displays the diffraction pattern.

According to Embodiment 1, executing the above processing in steps S1001 to S1006 makes it possible to display the reconstructed image (fictive image) in a position matching the visual acuity of the user with a computation cost based on Fourier transform. Furthermore, according to Embodiment 1, image quality of an area of the fictive image corresponding to a specific area improves depending on the content (e.g. position of the specific area) of the reconstructed image (fictive image). Therefore, a fictive image which has good visibility for the user can be displayed. In this embodiment, the distance determination unit 902 corresponds to an example of the position determination unit.

The area judging unit 904 uses image information to judge a specific area, but may use information other than an image. An example of this is shown in FIG. 11.

Figure 11:
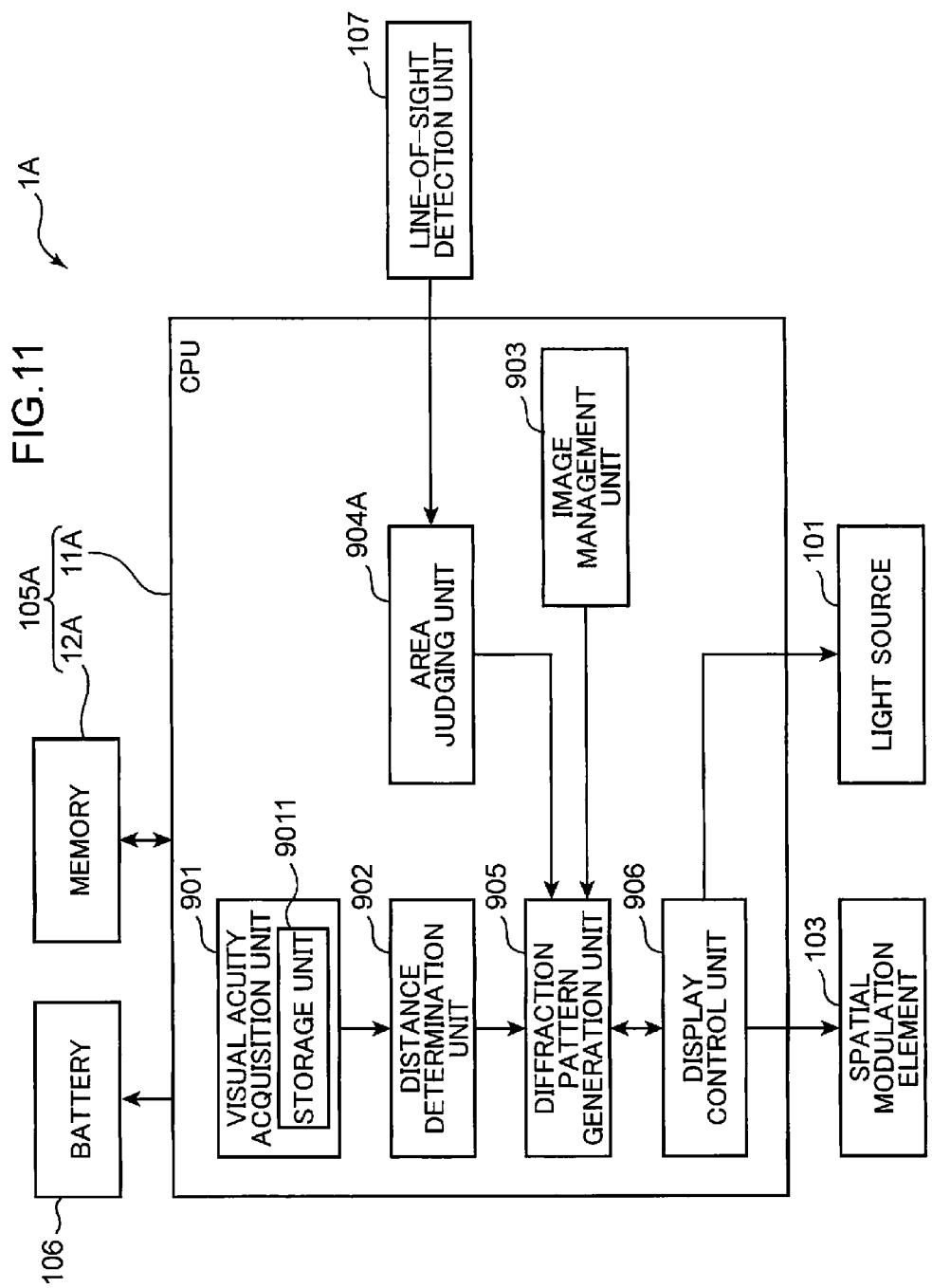
FIG. 11 shows another example of functional blocks of the display device according to Embodiment 1.

FIG. 11 is a functional block diagram of a display device 1A. Differences of the display device 1A from the display device 1 shown in FIG. 1 are that a control unit 105A is included instead of the control unit 105, and a line-of-sight detection unit 107 is further included. The control unit 105A includes a CPU 11A and a memory 12A. A difference of the CPU 11A from the CPU 11 shown in FIG. 1 is that an area judging unit 904A is included as a functional block, instead of the area judging unit 904. The CPU 11A implements each of the functional blocks shown in FIG. 11 by executing programs stored in the memory 12.

The line-of-sight detection unit 107 includes a CCD camera, for example, and detects a line-of-sight position of the user. The area judging unit 904A judges an area including the line-of-sight position of the user as the specific area, so that the image quality of the area located in the line-of-sight position of the user is optimized. In the case of the configuration in FIG. 11, the quality of an image located in the center field of view of the user can be optimized.

Further alternatively, the area judging unit 904 may judge an area of which image is optimized (specific area) depending on the peripheral environment, instead of the line of sight of the user. For example, in the case of displaying augmented reality (AR), in which reality and an image of the image management unit 903 are superposed to be displayed, the display device 1 may include a camera, and the area judging unit 904 may judge an area of which image quality is optimized (specific area) depending on a display object (e.g. sign board, traffic sign) in the outside world. In this case, even higher image quality can be implemented in an AR display.

Embodiment 2

Embodiment 2 shows an example of control to suppress noise that is generated when a fictive image is displayed, depending on the content of the display. In Embodiment 2, a composing element the same as or similar to that of Embodiment 1 is denoted with a same or similar reference symbol.

Figure 12:
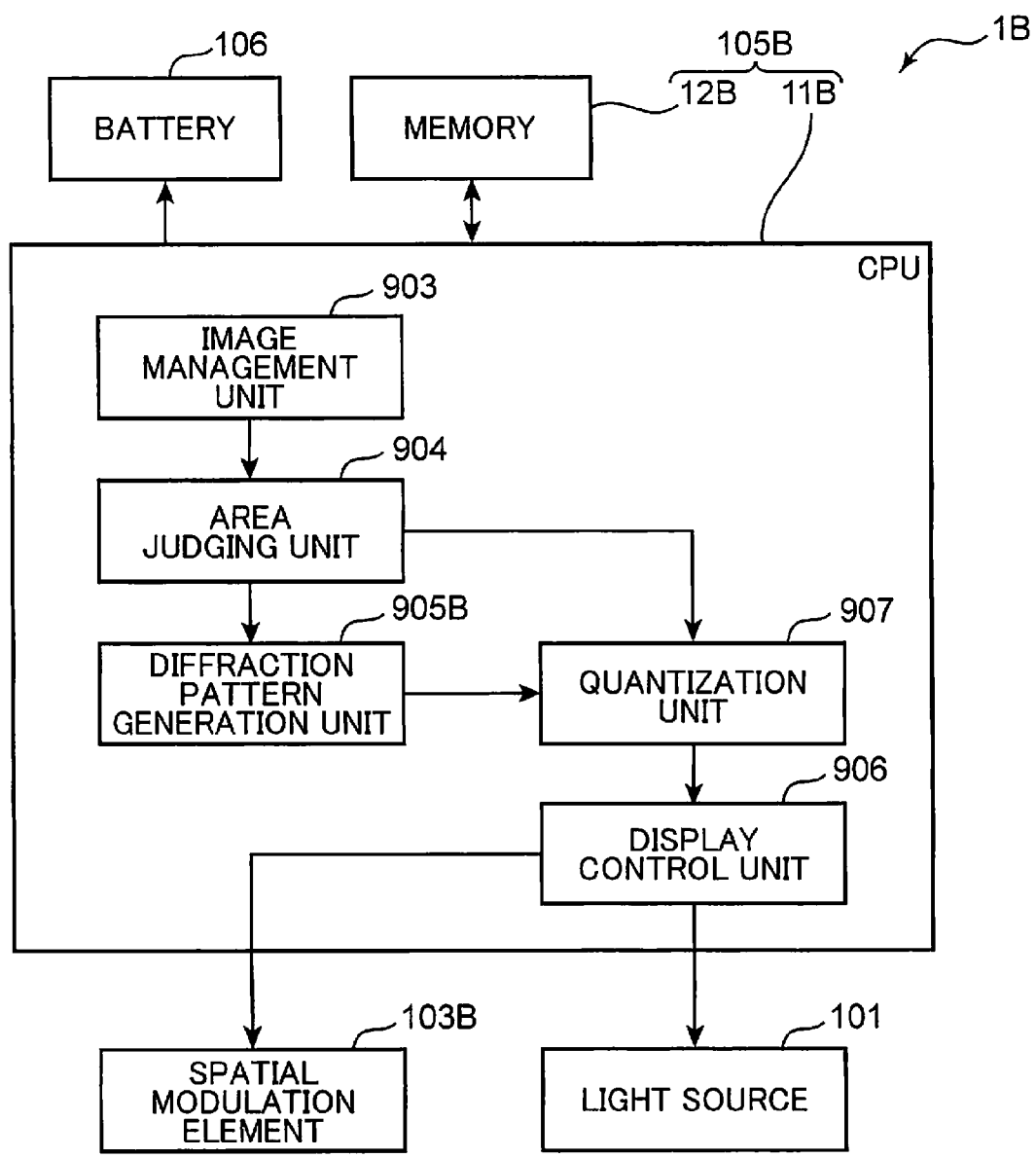
FIG. 12 shows an example of functional blocks of a display device according to Embodiment 2.

FIG. 12 is a functional block diagram of a display device 1B according to Embodiment 2. The configuration of the head-mounted display device (HMD) 1B according to Embodiment 2 is similar to that of Embodiment 1 shown in FIG. 2, therefore description is omitted. A function of each functional block in FIG. 12 will be described later.

The differences of the display device 1B from the display device 1 shown in FIG. 1 are that a spatial modulation element 103B is included instead of the spatial modulation element 103, and a control unit 105B is included instead of the control unit 105. The control unit 105B includes a CPU 11B and a memory 12B. As functional blocks, the CPU 11B includes an image management unit 903, an area judging unit 904, a diffraction pattern generation unit 905B, a display control unit 906, and a quantization unit 907. The CPU 11B implements each of the functional blocks mentioned above by executing programs stored in the memory 12B.

The spatial modulation element 103B of Embodiment 2 is configured so that only two or more specific phase values can be displayed. The spatial modulation element 103B of Embodiment 2 may be constituted by ferroelectric liquid crystals which can display only two phase values (specific phase values) of 0 and $\pi$, for example. Instead, the spatial modulation element 103B of Embodiment 2 may be configured so that only three phase values (specific phase values) of 0, $2/3\pi$ and $4/3\pi$ can be displayed.

In Embodiment 2, the control unit 105B performs processing to change a place where quantization noise (which is generated when the phase value of the diffraction pattern is quantized to a specific phase value) is generated according to the content of the image to be displayed to the user. A concrete procedure is described in detail hereinafter.

Figure 13:
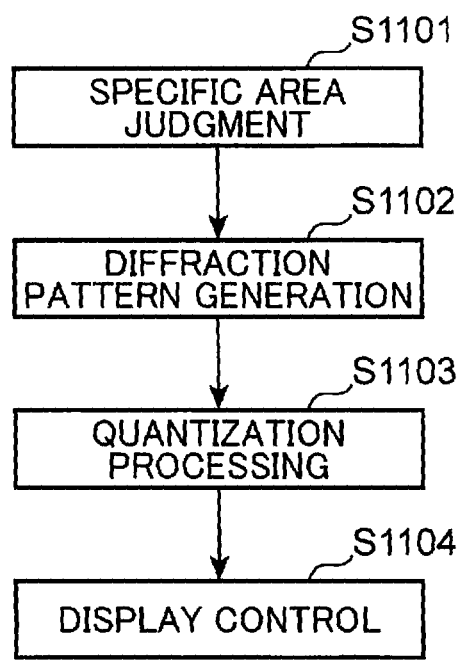
FIG. 13 is a flow chart depicting an operation according to Embodiment 2.

FIG. 13 is a flow chart depicting an operation according to Embodiment 2. In Embodiment 2, the control unit 105B changes a place where the quantization noise is generated by executing the processing in steps S1101 to S1104 in FIG. 13.

<Step S1101> (Specific Area Judgment)

In step S1101, the area judging unit 904 included in the control unit 105B judges a specific area of which image quality should be optimized, out of the image to be displayed to the user.

In Embodiment 2, the area judging unit 904 acquires a display image from the image management unit 903 that manages an image to be displayed to the user. In Embodiment 2, the area judging unit 904 judges an area where an image is displayed (area of which pixel value of the image is not 0) as a specific area. Details of this processing, which is the same as Embodiment 1, are omitted.

As a method for judging an area where an image is displayed, the area judging unit 904 may use such a method as image analysis, instead of judging based on the pixel value. The area judging unit 904 may hold a priority level based on the type of information in the area judging unit 904 in advance, and judge a specific area using this priority level. Further, the area judging unit 904 may judge the specific area using a method other than image analysis. For example, the image management unit 903 may embed the information on the specific area in meta data, for example, attached to the image in advance, and the area judging unit 904 may judge the specific area using this information.

The image to be displayed to the user is not limited to a specific format, but may be a still image or may be a video image. The image to be displayed to the user may be character information such as text.

The way of indicating the result of judging the specific area is not limited to a specific format, but may be any format. In the example of above-described Embodiment 1, the display screen is segmented into nine areas "upper right area", "right of center area", "lower right area", "above center area", "center area", "below center area", "upper left area" "left of center area" and "lower left area" as shown in FIG. 8, and a specific area of which image quality should be optimized is selected from the nine areas. Alternatively, the specific area of which image quality should be optimized may be indicated by the coordinate values on the display screen. In this case, the range of optimizing the image quality can be specified in more detail.

The area judging unit 904 may use information other than an image to judge the specific area, in the same manner as Embodiment 1. For example, as FIG. 11 shows, the display device 1B may include a line-of-sight detection unit 107 for detecting a line-of-sight position of the user, and the area judging unit 904 may judge an area located in the line-of-sight position of the user as the specific area, so that the image quality of the area located in the line-of-sight position of the user is optimized. Further alternatively, the area judging unit 904 may judge an area of which image is optimized (specific area) depending on the peripheral environment, instead of the line of sight of the user.

The area judging unit 904 notifies the information on the judged specific area to the quantization unit 907.

<Step S1102> (Diffraction Pattern Generation)

In step S1102, the diffraction pattern generation unit 905B generates a diffraction pattern from an image acquired from the image management unit 903.

In Embodiment 2, the diffraction pattern generation unit 905B acquires an image to be displayed to the user from the image management unit 903, adds a random phase value in a range of 0 to $2\pi$ to each pixel of the acquired image, and then performs inverse Fourier transform, so as to generate a basic diffraction pattern.

The diffraction pattern generation unit 905B notifies the generated basic diffraction pattern to the quantization unit 907.

In Embodiment 2, the diffraction pattern generation unit 905B generates a diffraction pattern by performing inverse Fourier transform on the image. However, the diffraction pattern generation unit 905B may generate a diffraction pattern using a different method. For example, the diffraction pattern generation unit 905B may generate a diffraction pattern by superposing a correction pattern selected from information on the visual acuity of the user or a specific area of the image, and a basic diffraction pattern generated by performing inverse Fourier transform on the image, in the same manner as Embodiment 1, to generate a diffraction pattern. In this case, by performing not only noise suppression but also correction based on the visual acuity of the user or the position of the specific area at the same time, the image quality can be further improved. The diffraction pattern generation unit 905B may compute a diffraction pattern by using the point filling method for the original image, for example. In this case, a more realistic three-dimensional image can be presented to the user.

<Step S1103> (Phase Quantization)

In step S1103, the quantization unit 907 performs quantization processing on the basic diffraction pattern acquired from the diffraction pattern generation unit 905B, using information of the specific area of the image acquired from the area judging unit 904.

As described above, in a case where the spatial modulation element 103B can display only specific phase values, it is necessary to perform quantization processing on each pixel of a diffraction pattern which has phase values in a range of 0 to 2π, so that each pixel has a phase value that the spatial modulation element 103B can display. In this case, a noise called "quantization noise" is generated in the reconstructed image displayed to the user, due to the difference between the phase value of each pixel of the original image and the phase value after quantization. As described above, the generated quantization noise can be concentrated to a specific position by propagating an error generated in a pixel into peripheral pixels using the error diffusion coefficients shown in FIG. 37.

Figures 14, 15:
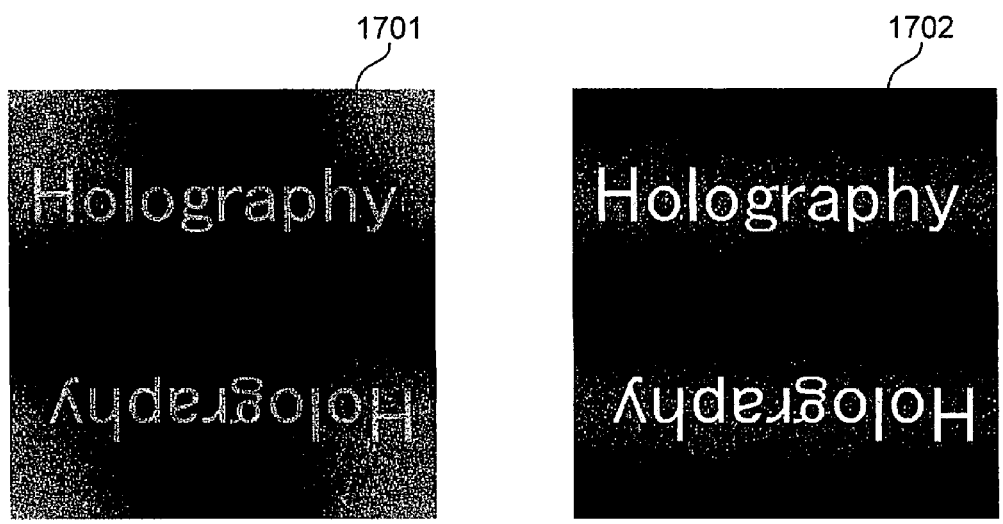
FIG. 14 shows an example of the differences of noise generation depending on the quantization method for a diffraction pattern.
FIG. 15 shows an example of a table for managing diffusion coefficients to control noise.

FIG. 14 shows an example of the difference of quantization noise generation depending on the quantization method for a diffraction pattern. The reconstructed image 1701 is an example of a reconstructed image (fictive image) after the error diffusion is performed on the diffraction pattern using the diffusion coefficients shown in FIG. 37. In the reconstructed image 1701, a white glow, which is generated as quantization noise, is concentrated at four corners of the display screen, and the quantization noise at the center of the display screen has been reduced.

The reconstructed image 1702 is an example after quantization processing is performed without error diffusion. In the reconstructed image 1702, the white glow generated as quantization noise is diffused on the entire display screen. Thus, the generation state of the quantization noise can be changed by the quantization unit 907 performing error diffusion during the quantization processing. FIG. 14 shows examples when the quantization unit 907 performs binarization of 0 and π as the quantization processing. Therefore, the inverted image is formed at the lower portion of the display screen as shown in FIG. 14.

The location where the quantization noise is generated can be changed by changing the coefficient values of the diffusion coefficients as shown in FIG. 37. Therefore, in Embodiment 2, the quantization unit 907 holds information on areas where noise is suppressed and a diffusion coefficient for suppressing the noise in that area. For example, in a case where the positive and negative of the signs of the diffusion coefficients in FIG. 37 are inverted, the quantization noise is concentrated at the center of the upper half (a portion where the word "Hologram" exists) of the display screen, and the quantization noise at four corners of the display screen can be suppressed.

FIG. 15 shows an example of a table for managing a combination of an area where noise is suppressed and an error diffusion coefficient. In FIG. 15, the filter ID indicates a numeric value for identifying a diffusion coefficient (filter) shown in FIG. 37. The quantization unit 907 holds a concrete diffusion coefficient (filter) that corresponds to each filter ID. The quantization unit 907 performs the quantization processing using the diffusion coefficient of the filter ID that corresponds to the specific area notified by the area judging unit 904. By this processing, the quantization noise of a specific area of the image can be suppressed.

The format of the diffusion coefficient held by the quantization unit 907 need not be limited to a specific format, but can be arbitrary. For example, the quantization unit 907 may use a 3×3 table format as shown in FIG. 37. Alternatively, the quantization unit 907 may use a larger table format. In this case, an area where noise is suppressed can be more accurately controlled. Further, the quantization unit 907 may generate a diffusion coefficient when necessary, instead of holding the diffusion coefficients in advance. For example, the quantization unit 907 may generate a diffusion coefficient according to the position or size of the specific area judged by the area judging unit 904. In this case, an appropriate diffusion coefficient, which matches the position or size of the specific area judged by the area judging unit 904, can be used.

The quantization unit 907 notifies the generated diffraction pattern to the display control unit 906.

<Step S1104> (Display Control)

In step S1104, the display control unit 906 performs processing to display the diffraction pattern, generated by the quantization unit 907 in the previous step S1103, on the spatial modulation element 103B.

In Embodiment 2, the display control unit 906 controls the modulation amount of the spatial modulation element 103B, which is a ferroelectric liquid crystal element, so that the spatial modulation element 103B can express the phase values of the diffraction pattern. The display control unit 906 controls the output of the light source 101 so that the output corresponds to the wavelength of the diffraction pattern the spatial modulation element 103 displays. Step S1104 implements display of the reconstructed image (fictive image) to the user, using the diffracted light from the spatial modulation element 103B that displays the diffraction pattern.

According to Embodiment 2, executing the above processing in steps S1101 to S1104 makes it possible to suppress the quantization noise of a specific area depending on the content (e.g. position of the specific area) of the reconstructed image (fictive image). As a result, a fictive image which has good visibility for the user can be displayed.

Embodiment 3

Embodiment 3 shows an example of control to display a fictive image having a wide viewing angle, by changing the diffracted light used for display depending on the position of the fictive image to be displayed to the user. In Embodiment 3, a composing element the same as or similar to that of Embodiment 1 is denoted with a same or similar reference symbol.

Figure 16:
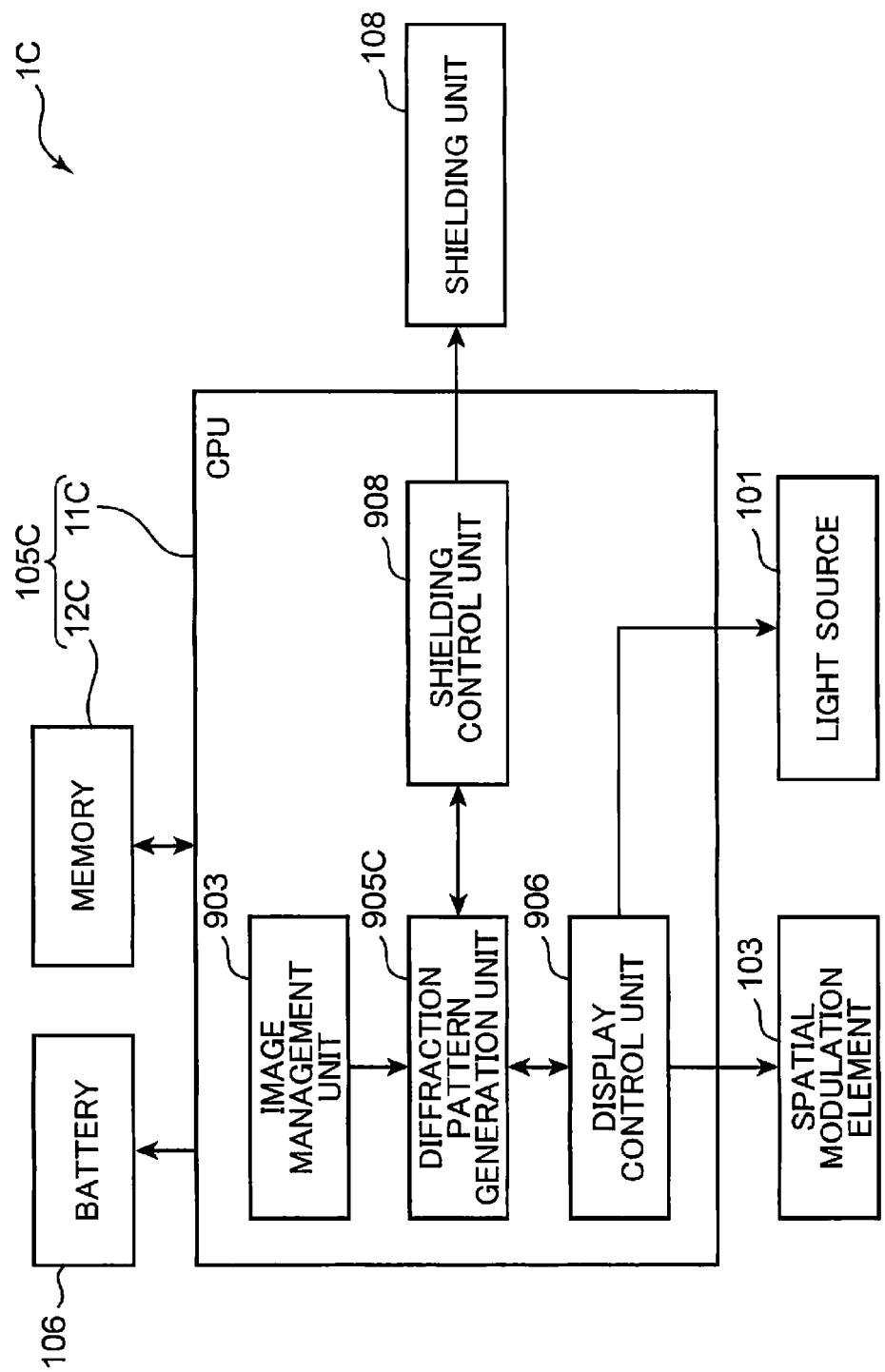
FIG. 16 shows an example of functional blocks of a display device according to Embodiment 3.
Figure 17:
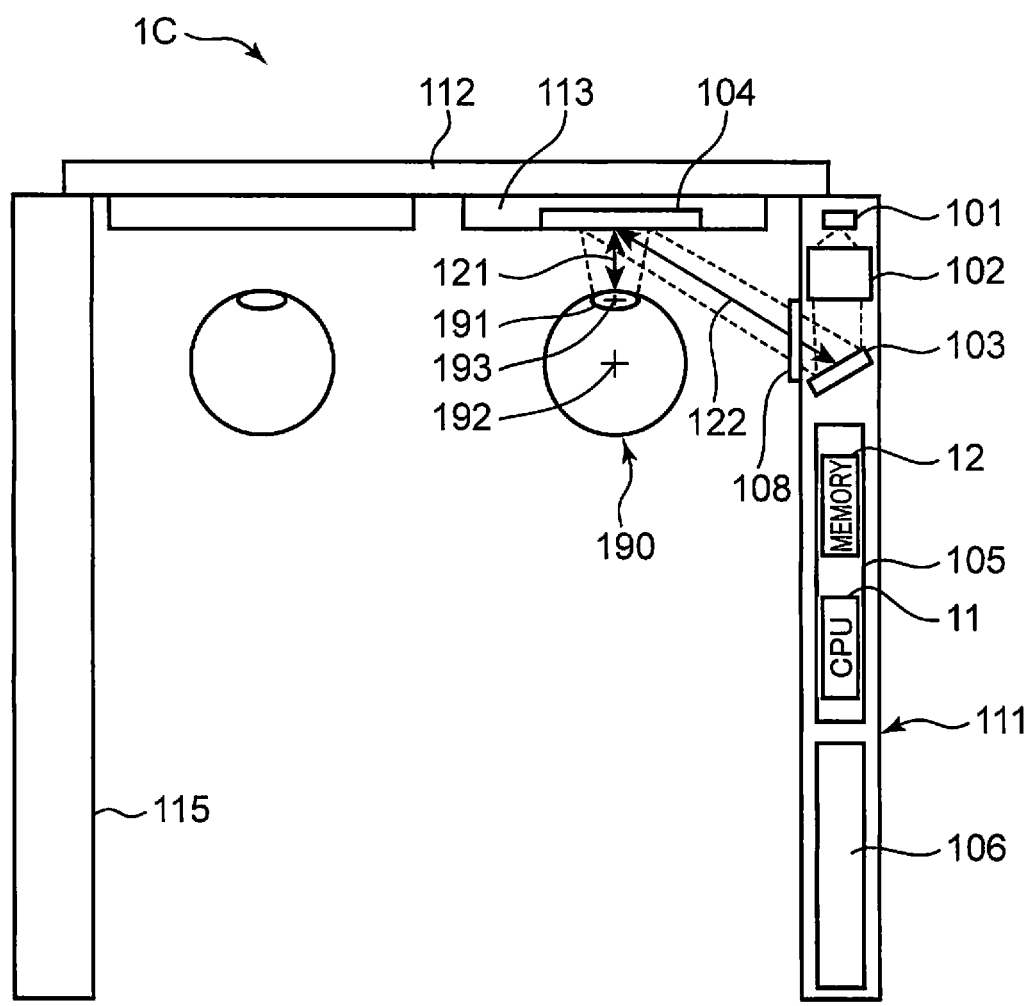
FIG. 17 is a diagram depicting a configuration of the display device according to Embodiment 3.

FIG. 16 is a functional block diagram of a display device 1C according to Embodiment 3. FIG. 17 shows a configuration of the display device 1C according to Embodiment 3. Description on a composing element the same as that of Embodiment 1 is omitted.

The differences of the display device 1C from the display device 1 shown in FIG. 1 are that a control unit 105C is included instead of the control unit 105, and a shielding unit 108 is further included. The control unit 105C includes a CPU 11C and a memory 12C. As functional blocks, the CPU 11C includes an image management unit 903, a diffraction pattern generation unit 905C, a display control unit 906 and a shielding control unit 908. The CPU 11C implements each of the functional blocks mentioned above by executing programs stored in the memory 12C. A function of each functional block in FIG. 16 will be described later.

The shielding unit 108 of Embodiment 3 shields or transmits the diffracted light from the spatial modulation element 103. As FIG. 17 shows, the shielding unit 108 is disposed contacting the temple portion 111 so as to cover the emitting window 114 (FIG. 2) disposed in the temple portion 111.

Figure 18:
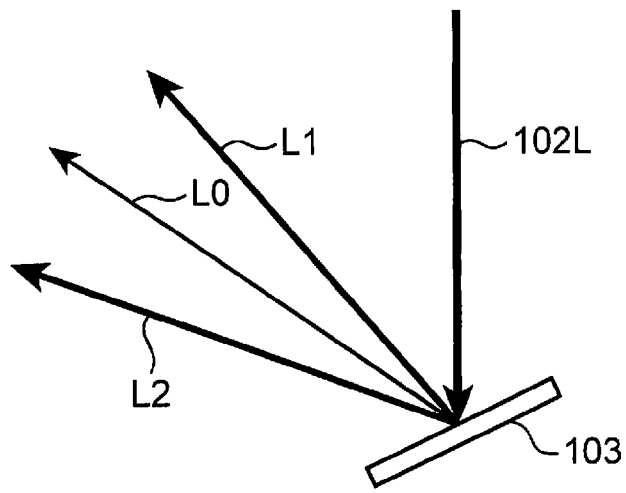
FIG. 18 shows an example of diffracted light from a spatial modulation element.

FIG. 18 shows an example of diffracted light from the spatial modulation element 103. FIG. 18 shows a state where the illumination light 102L from the illumination optical system 102 (FIG. 17) is diffracted by the diffraction pattern displayed on the spatial modulation element 103, and zero-order diffracted light L0, plus first-order diffracted light L1, and minus first-order diffracted light L2 are generated. In FIG. 18, a second-order and higher-order diffracted light is not illustrated. The zero-order diffracted light refers to light simply reflected by the spatial modulation element 103 without being diffracted by the diffraction pattern.

Figure 19:
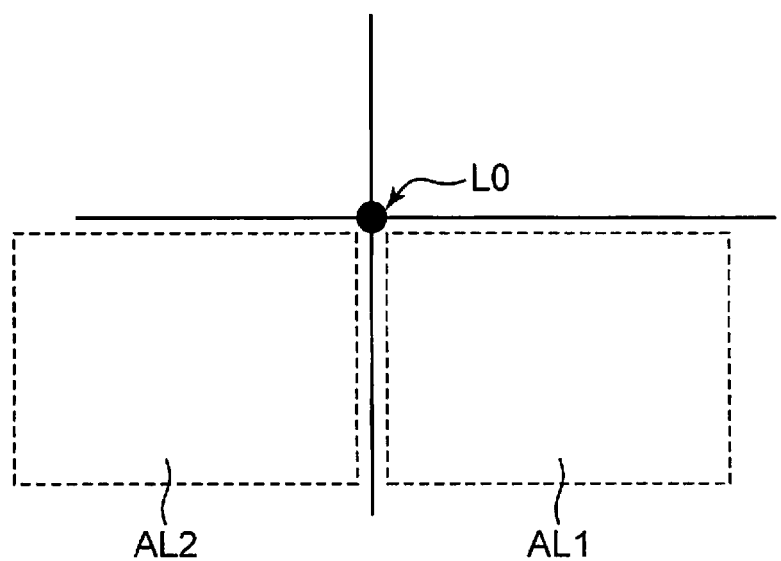
FIG. 19 shows an example of a display area of a fictive image depending on diffracted light.

FIG. 19 shows an example of a difference of a display area of a fictive image depending on the diffracted light. In a case where the diffracted light L0, L1 and L2 shown in FIG. 18 are reflected by the reflecting mirror 104 and projected to the eye of the user without being shielded, the display areas become as shown in FIG. 19. In other words, as FIG. 19 shows, the plus first-order diffracted light and the minus first-order diffracted light form reconstructed images (fictive images) respectively in the display areas AL1 and AL2, of which the fields of view of the user are different from each other, with the zero-order diffracted light L0 therebetween. Therefore, by changing the order of the diffracted light to be used depending on the display position of the image, which is displayed to the user, a fictive image having a wide field of view can be displayed. For example, in a case where image is displayed on the right half of the field of view of the user, the plus first-order diffracted light is used, and the minus first-order diffracted light is shielded.

Figure 20A:
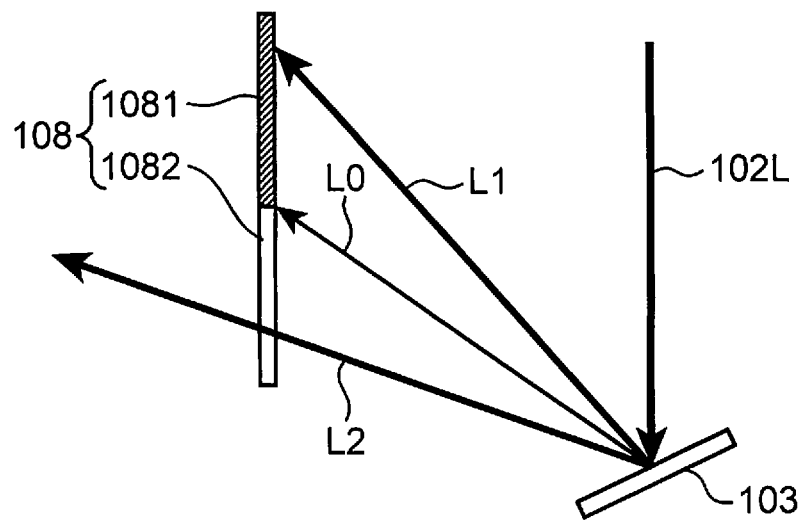
FIGS. 20A and 20B show examples of transmission and shielding of diffracted light according to Embodiment 3.
Figure 20B:
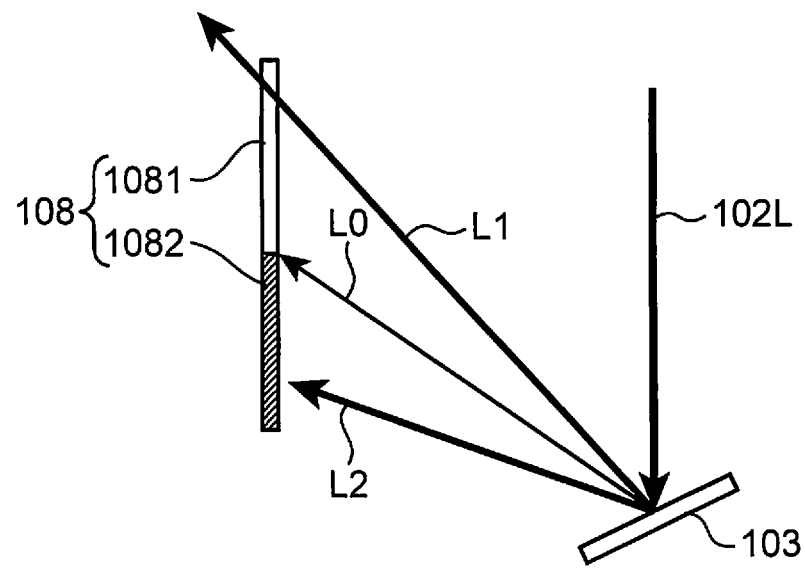

FIGS. 20A and 20B show examples of operation of the shielding unit 108 when the diffracted light to be used for display is changed. FIG. 20A shows an example when the minus first-order diffracted light is used. In FIG. 20A, a partial area 1082 (white portion in FIG. 20A) of the shielding unit 108 transmits light, and the other partial area 1081 (shaded portion in FIG. 20A) shields light. The partial area 1082 in FIG. 20A corresponds to the display area AL2 of the minus first-order diffracted light in FIG. 19.

FIG. 20B shows an example when the plus first-order diffracted light is used for display. In FIG. 20B, a partial area 1081 (white portion in FIG. 20B) of the shielding unit 108 transmits light, and the other partial area 1082 (shaded portion in FIG. 20B) shields light. The partial area 1081 in FIG. 20B corresponds to the display area AL1 of the plus first-order diffracted light in FIG. 19.

The display area AL1 and display area AL2 in FIG. 19 display a same reconstructed image (fictive image) where only the order of the diffracted light is different. Therefore, the field of view of the fictive image to be displayed can be widened by synchronizing the switching of transmission and shielding shown in FIGS. 20A and 20B and the switching of an image to be displayed to the field of view of the user (that is, the switching of a diffraction pattern to be displayed on the spacial modulation element 103). In this embodiment, the partial area 1081 corresponds to an example of the first partial area, the partial area 1082 corresponds to an example of the second partial area, the display area AL1 corresponds to an example of the first display area, the display area AL2 corresponds to an example of the second display area, the state of the shielding unit 108 shown in FIG. 20B corresponds to an example of the first state, and the state of the shielding unit 108 shown in FIG. 20A corresponds to an example of the second state.

Figure 21:
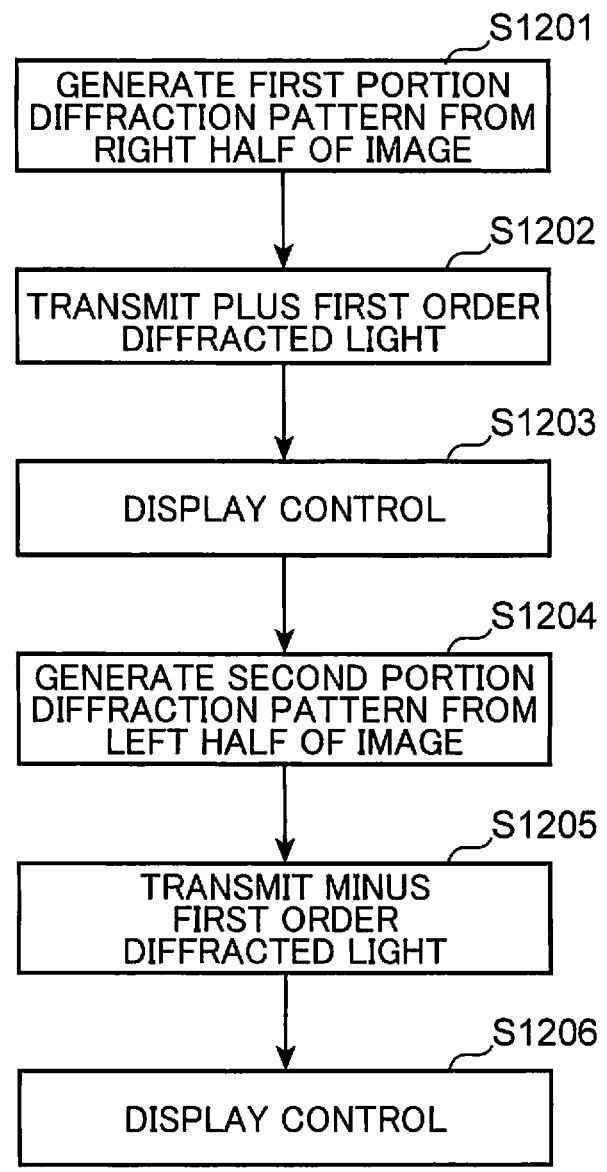
FIG. 21 is a flow chart depicting an operation according to Embodiment 3.

FIG. 21 is a flow chart depicting an operation according to Embodiment 3. In Embodiment 3, the control unit 105C displays an image with a wide field of view by executing the processing in steps S1201 to S1206 in FIG. 21.

<Step S1201> (Diffraction Pattern Generation)

In step S1201, the diffraction pattern generation unit 905C generates a diffraction pattern from a right half of the original image acquired from the image management unit 903.

In Embodiment 3, the diffraction pattern generation unit 905C acquires an image to be displayed to the user from the image management unit 903, adds a random phase value in a range of 0 to $2\pi$ to each pixel of the right half of the image, and then performs inverse Fourier transform, so as to generate a first portion diffraction pattern which corresponds to the right half of the image.

The diffraction pattern generation unit 905C notifies the generated first portion diffraction pattern to the display control unit 906.

<Step S1202> (Transmission and Shielding)

In step S1202, the shielding control unit 908 controls the transmitting area and the shielding area of the shielding unit 108 as shown in FIG. 20B.

<Step S1203> (Display Control)

In step S1203, the display control unit 906 displays the first portion diffraction pattern, generated by the diffraction pattern generation unit 905C in step S1201, on the spatial modulation element 103.

<Step S1204> (Diffraction Pattern Generation)

In step S1204, the diffraction pattern generation unit 905C generates a diffraction pattern from a left half of the original image acquired from the image management unit 903.

In Embodiment 3, the diffraction pattern generation unit 905C acquires an image to be displayed to the user from the image management unit 903, adds a random phase value in a range of 0 to $2\pi$ to each pixel of the left half of the image, and then performs inverse Fourier transform, so as to generate a second portion diffraction pattern which corresponds to the left half of the image.

The diffraction pattern generation unit 905C notifies the generated second portion diffraction pattern to the display control unit 906.

<Step S1205> (Transmission and Shielding)

In step S1205, the shielding control unit 908 controls the transmitting area and the shielding area of the shielding unit 108 as shown in FIG. 20A.

<Step S1206> (Display Control)

In step S1206, the display control unit 906 displays the second portion diffraction pattern, generated by the diffraction pattern generation unit 905C in step S1204, on the spatial modulation element 103.

According to Embodiment 3, by executing the above processing in steps S1201 to S1206, the shielding unit 108 alternately transmits the plus first-order diffracted light L1 and the minus first-order diffracted light L2, and the right half reconstructed image (fictive image) is displayed to the user when the plus first-order diffracted light L1 is transmitted, and the left half reconstructed image (fictive image) is displayed to the user when the minus first-order diffracted light L2 is transmitted. Therefore, according to Embodiment 3, the display field of view of the reconstructed image (fictive image) displayed to the user can be widened.

In FIG. 17, the shielding unit 108 is disposed contacting the temple portion 111, but is not limited to this configuration.

Figure 22:
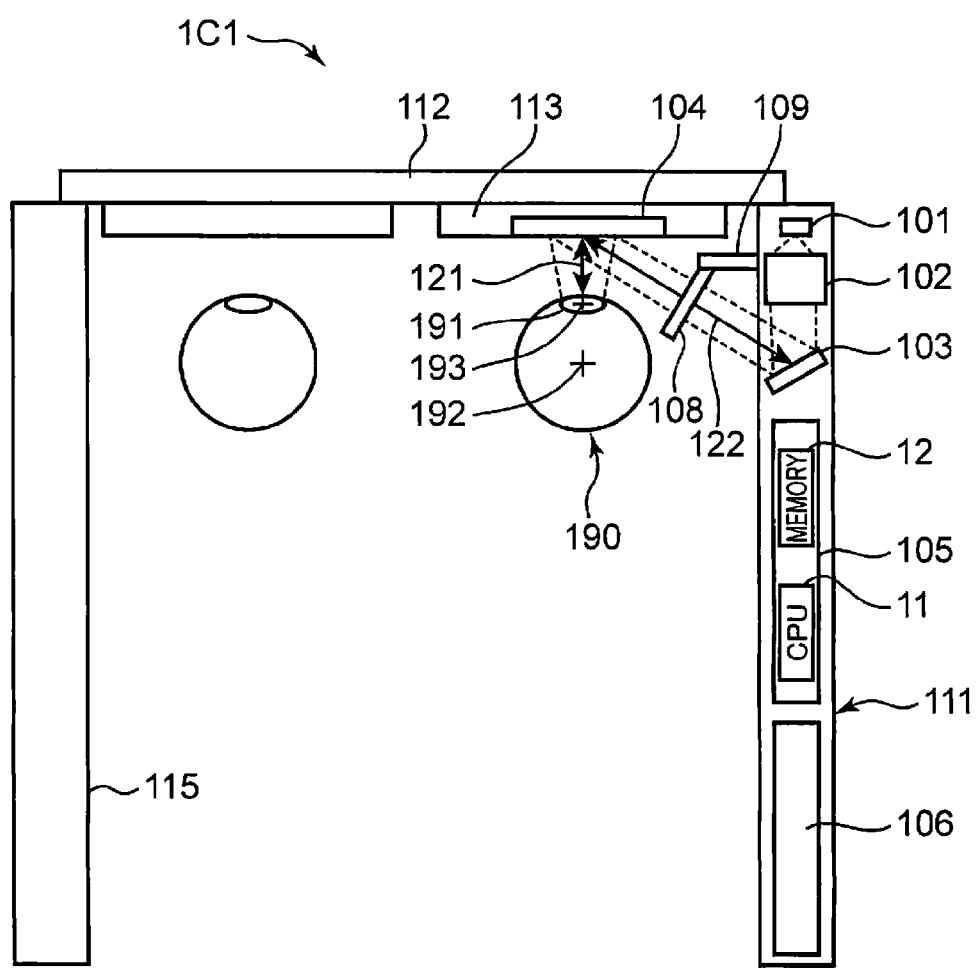
FIG. 22 is a diagram depicting a display device having a configuration which is different from the display device in FIG. 17.

FIG. 22 shows a display device 1C1 of which configuration is different from the display device 1C in FIG. 17. In the display device 1C1 in FIG. 22, the shielding unit 108 is disposed in a position distant from the temple portion 111, by a holding unit 109 that holds the shielding unit 108. For example, the shielding unit 108 is disposed in the vicinity of an intermediate position between the spatial modulation element 103 and the reflecting mirror 104. In other words, in the display device 1C1 in FIG. 22, the distance between the spatial modulation element 103 and the shielding unit 108 is longer than that of the display device 1C in FIG. 17. By this configuration, the shielding unit 108 can be disposed in a position with which the plus first-order diffracted light L1 and the minus first-order diffracted light L2 can be sufficiently separated. Therefore, the shielding unit 108 can more easily transmit only necessary diffracted light.

Figure 23:
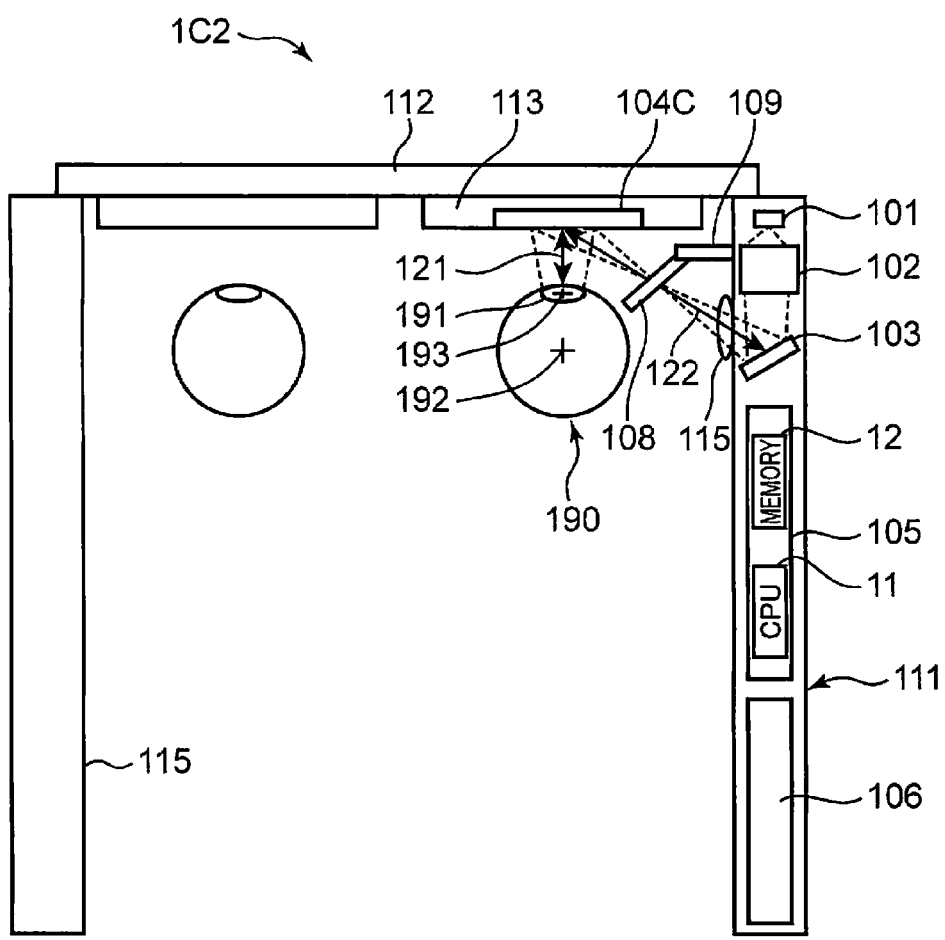
FIG. 23 is a diagram depicting another display device having a configuration which is different from the display device in FIG. 17.
Figure 24:
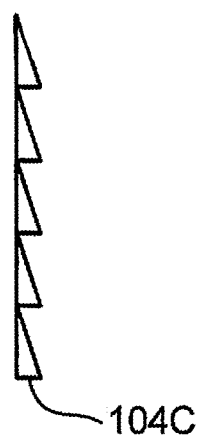
FIG. 24 shows an example of a shape of a reflecting mirror disposed in the display device in FIG. 23.

FIG. 23 shows a display device 1C2 of which configuration is also different from the display device 1C in FIG. 17. FIG. 24 shows an example of the shape of the reflecting mirror 104C disposed in the display device 1C2 in FIG. 23.

The differences of the display device 1C2 in FIG. 23 from the display device 1C1 in FIG. 22 are that a reflecting mirror 104C is included instead of the reflecting mirror 104, and a collective lens 115 is further included. The collective lens 115 is disposed in the temple portion 111 so as to block the emitting window 114 (FIG. 2) disposed in the temple portion 111. The collective lens 115 collects the diffracted light from the spatial modulation element 103 once before the diffracted light enters the reflecting mirror 104C. The shielding unit 108 is held by the holding unit 109 and is disposed in the vicinity of the collecting point of the diffracted light. The reflecting mirror 104C reflects the diffracted light from the spatial modulation element 103, collected by the collective lens 115, toward the eyeball 190 of the user.

In the display device 1C2 in FIG. 23, the diffracted light collected once by the collective lens 115 transmits through the shielding unit 108, and enters the reflecting mirror 104C as diverged light. In order to display a fictive image to the user, it is desirable that the diffracted light enters the eyeball 190 as a parallel light or converged light. Hence, in the display device 1C2 in FIG. 23, the reflecting mirror 104C may be configured to have an optical power to converge the diffused light.

In the display device 1C2 in FIG. 23, the reflecting mirror 104C is constituted by a Fresnel lens as shown in FIG. 24. The configuration for the reflecting mirror 104C to have optical power is not limited to a specific configuration. For example, the reflecting mirror 104C may be constituted by a diffraction grating or a volume hologram. In this case, there is an advantageous effect that the reflecting mirror 104C can be slimmer.

Figure 25A:
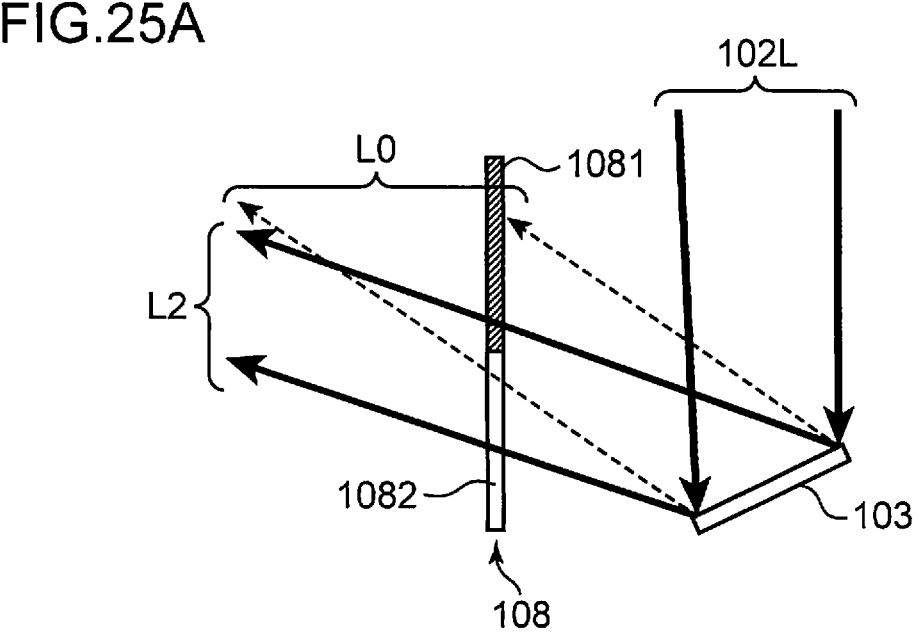
FIG. 25A and FIG. 25B are diagrams depicting an effect of collecting diffracted lights from the spatial modulation element.
Figure 25B:
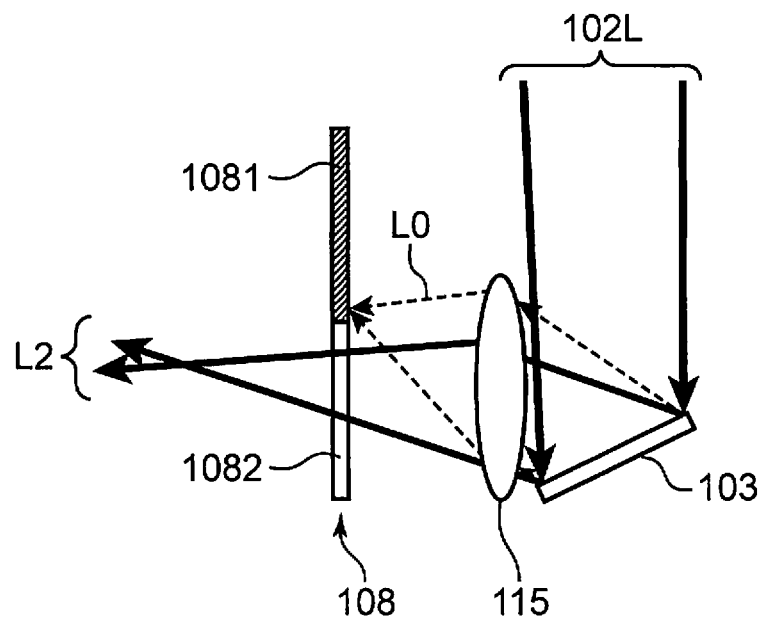

FIGS. 25A and 25B are diagrams depicting an effect of collecting diffracted light from the spatial modulation element 103 in the display device 1C2 having the collective lens 115. FIG. 25A shows a configuration where the diffracted light from the spatial modulation element 103 is not collected, as a comparison example. FIG. 25B shows a configuration of the display device 1C2 where the diffracted light from the spatial modulation element 103 is collected.

In the configuration in FIG. 25A, the zero-order diffracted light L0 and the minus first-order diffracted light L2 generated from the spatial modulation element 103 are not sufficiently separated at the position of the shielding unit 108. Hence, a part of the zero-order diffracted light L0 transmits through the partial area 1082 of the shielding unit 108.

In the configuration of FIG. 25B, on the other hand, the zero-order diffracted light L0 and the first-order diffracted light L2 are separated at the position of the shielding unit 108, since the diffracted light from the spatial modulation element 103 transmits through the collective lens 115. As a result, only the zero-order diffracted light L0 can be shielded by the partial area 1081 of the shielding unit 108. By using this configuration, undesired light for displaying the fictive image can be appropriately shielded.

In the display device 1C1 in FIG. 22 and the display device 1C2 in FIG. 23, the shielding unit 108 is held by the holding unit 109, which is created separately from the shielding unit 108. However, the display devices 1C1 and 1C2 are not limited to this. The display devices 1C1 and 1C2 may have a holding unit integrated with the shielding unit 108 as one unit.

The configuration to shield the diffracted light is not limited to a specific configuration, but may be an arbitrary configuration. For example, the shielding unit 108 may be implemented by a liquid crystal shutter. Instead, the shielding unit 108 may be implemented by a liquid crystal panel that is configured to be able to diffract incident light by forming interference fringes on a surface of the panel, and is configured to be able to control presence or absence of the interference fringes by applying voltage. In these cases, movable parts are not required and durability can be improved.

Further, the shielding unit 108 may be configured by a polarizing plate that shields light in a specific direction at high-speed, and a wavelength plate that switches the polarizing direction of the light at high-speed, where the light emitted from the light source 101 is linearly polarized light in a specific direction, and may switch the transmission and shielding of light. In this case, the diffracted light to be used can be switched at high-speed. Further, the shielding unit 108 may be constituted by a mechanical movable component, so that the transmission and shielding are switched by moving the movable component.

In Embodiment 3, the diffraction pattern generation unit 905C may generate a correction pattern to correct aberration on the reflecting mirror 104. The diffraction pattern generation unit 905C may generate, as the diffraction pattern, a first portion composite diffraction pattern by combining the first portion diffraction pattern and the correction pattern. Furthermore, the diffraction pattern generation unit 905C may generate, as the diffraction pattern, a second portion composite diffraction pattern by combining the second portion diffraction pattern and the correction pattern. With this configuration, image quality of the fictive image can be improved.

Further, in this case, the plus first-order diffracted light L1 that transmits through the partial area 1081 of the shielding unit 108 and the minus first-order diffracted light L2 that transmits through the partial area 1082 of the shielding unit 108 enter different areas of the reflecting mirror 104. Therefore, the diffraction pattern generation unit 905C may generate the correction pattern to be combined with the first portion diffraction pattern (correction pattern for the case where the plus first-order diffracted light L1 is used) and the correction pattern to be combined with the second portion diffraction pattern (correction pattern for the case where the minus first-order diffracted light L2 is used) to be different from each other. With this configuration, aberration of the reflecting mirror 104 can be corrected more appropriately, and image quality of the fictive image can be further improved.

In Embodiment 3, the shielding unit 108 shields or transmits the diffracted light only in the horizontal directions of the image, but is not limited to this. For example, the shielding unit 108 may perform similar control for diffracted light in the vertical directions of the image. In this case, the viewing angle of the fictive image to be displayed can be widened in the vertical direction as well.

Figure 26A:
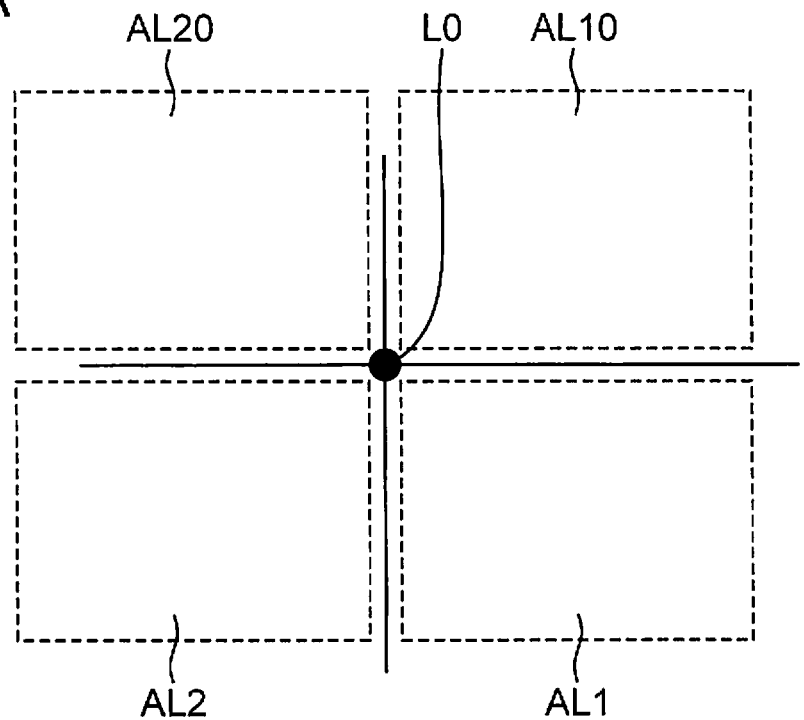
FIG. 26A shows another example of the display area of the fictive image depending on diffracted light.
Figure 26B:
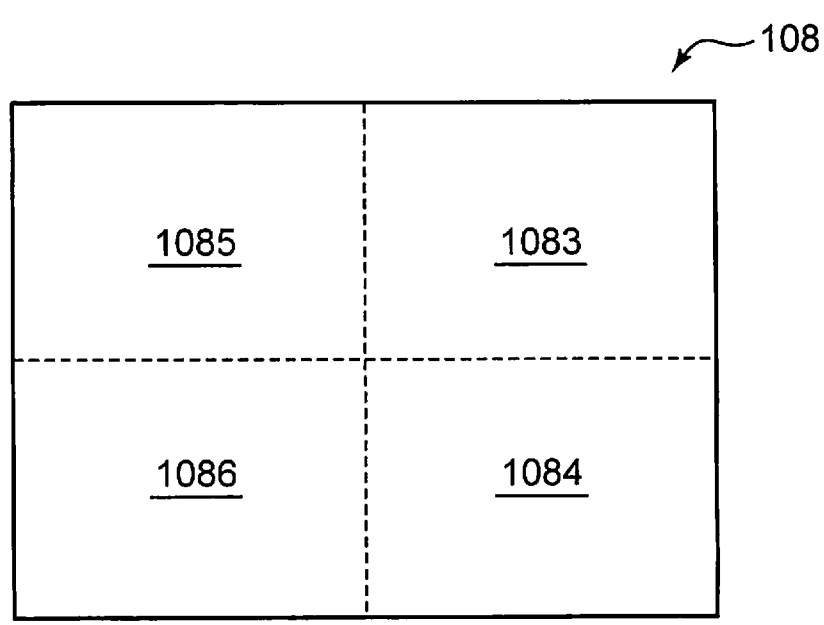
FIG. 26B shows another example of a partial area of the shielding unit.

FIG. 26A shows another example of a display area of a fictive image generated by the diffracted light, and FIG. 26B shows another example of the partial areas of the shielding unit.

If the diffracted lights L0, L1 and L2 shown in FIG. 18 are reflected by the reflecting mirror 104 and projected to the eyes of the user without being shielded, the display areas become as shown in FIG. 26A. In other words, as FIG. 26A shows, the plus first-order diffracted light and the minus first-order diffracted light form reconstructed images (fictive images) respectively in the display areas AL1 and AL2, of which the fields of view of the user are different from each other, with the zero-order diffracted light L0 therebetween. Further, although illustration was omitted in FIG. 19, the plus first-order diffracted light and the minus first-order diffracted light form reconstructed images (fictive images) respectively in the display areas AL10 and AL20, on the opposite side of the display areas AL1 and AL2, with the zero-order diffracted light L0 therebetween.

Therefore, as FIG. 26B shows, the shielding unit 108 is configured such that transmission and shielding can be switched in four partial areas, which are partial areas 1083, 1084, 1085 and 1086 corresponding to the display areas AL10, AL1, AL20 and AL2 respectively.

In the configurations in FIGS. 26A and 26B, the diffraction pattern generation unit 905C generates a diffraction pattern (first portion diffraction pattern) from a partial image in the upper right ¼ area of the original image to be displayed to the user. Synchronizing with the shielding control unit 908 setting the shielding unit 108 to a first state by setting the partial area 1083 of the shielding unit 108 to the transmitting area and setting the partial areas 1084, 1085 and 1086 to the shielding areas, the display control unit 906 displays the first portion diffraction pattern generated by the diffraction pattern generation unit 905C on the spatial modulation element 103.

In the same manner, the diffraction pattern generation unit 905C generates a diffraction pattern (second portion diffraction pattern) from a partial image in the lower right ¼ area of the original image. Synchronizing with the shielding control unit 908 setting the shielding unit 108 to a second state by setting the partial area 1084 of the shielding unit 108 to the transmitting area and setting the partial areas 1083, 1085 and 1086 to the shielding areas, the display control unit 906 displays the second portion diffraction pattern generated by the diffraction pattern generation unit 905C on the spatial modulation element 103.

In the same manner, the diffraction pattern generation unit 905C generates a diffraction pattern (third portion diffraction pattern) from a partial image in the upper left ¼ area of the original image. Synchronizing with the shielding control unit 908 setting the shielding unit 108 to a third state by setting the partial area 1085 of the shielding unit 108 to the transmitting area and setting the partial areas 1083, 1084 and 1086 to the shielding areas, the display control unit 906 displays the third portion diffraction pattern generated by the diffraction pattern generation unit 905C on the spatial modulation element 103.

In the same manner, the diffraction pattern generation unit 905C generates a diffraction pattern (fourth portion diffraction pattern) from a lower left ¼ area of the original image. Synchronizing with the shielding control unit 908 setting the shielding unit 108 to a fourth state by setting the partial area 1086 of the shielding unit 108 to the transmitting area and setting the partial areas 1083, 1084 and 1085 to the shielding areas, the display control unit 906 displays the fourth portion diffraction pattern generated by the diffraction pattern generation unit 905C on the spatial modulation element 103.

As described above, according to the configurations in FIGS. 26A and 26B, the viewing angle of the fictive image to be displayed can be widened in both the horizontal direction and vertical direction, by synchronizing the diffraction pattern to be generated and switching the states of the shielding unit 108.

Embodiment 4

Embodiment 4 shows an example of control to display a fictive image having a wide field of view, by changing the incident angle of the illumination light that illuminates the spatial modulation element 103 depending on the position of the fictive image to be displayed to the user. In Embodiment 4, a composing element the same as or similar to that of Embodiment 1 is denoted with a same or similar reference symbol.

Figure 27:
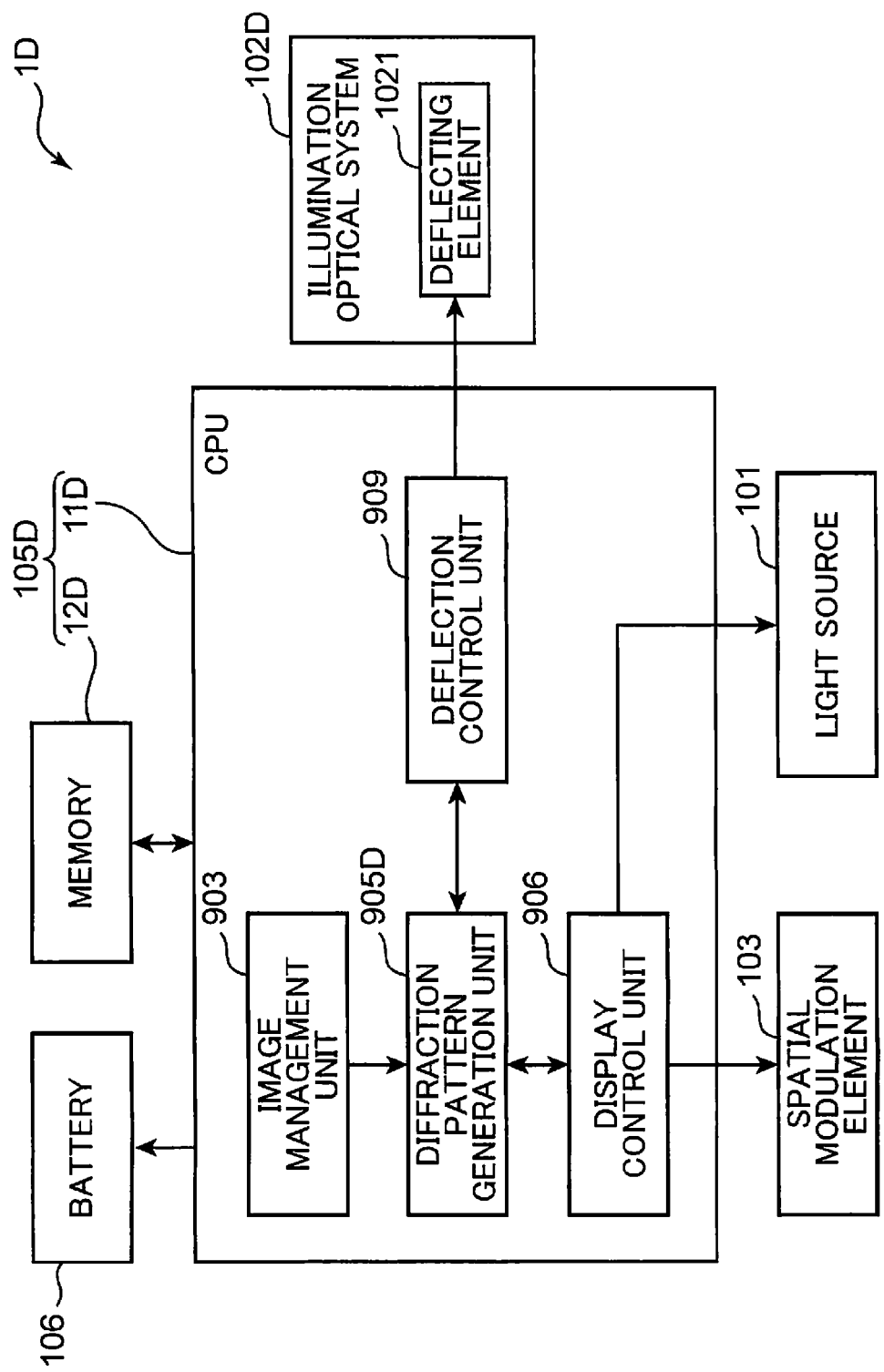
FIG. 27 shows an example of functional blocks of a display device according to Embodiment 4.
Figure 28A:
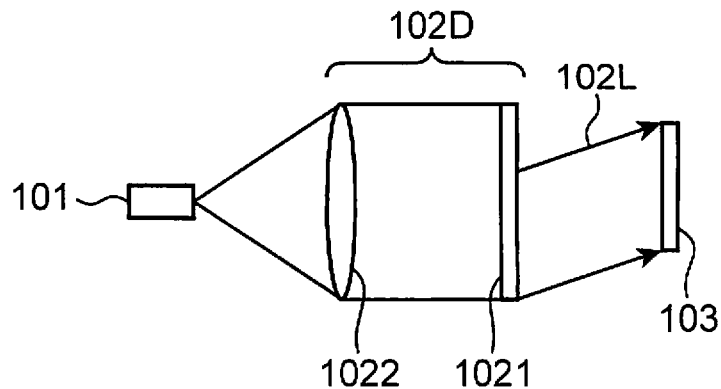
FIGS. 28A, 28B and 28C are diagrams depicting configuration and operation of the illumination optical system according to Embodiment 4.
Figure 28B:
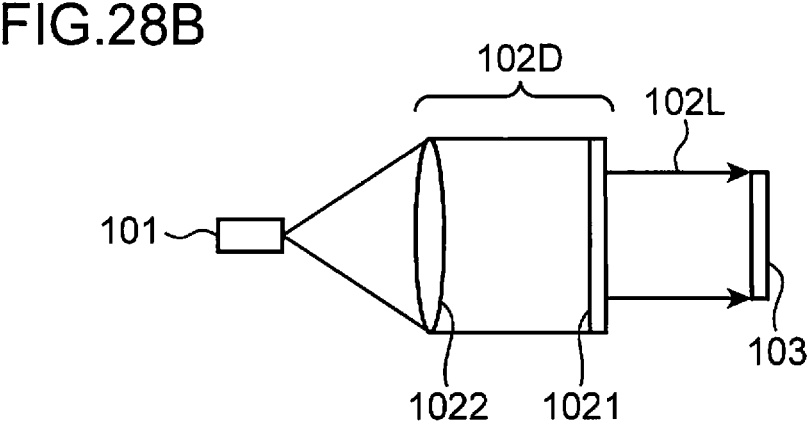
Figure 28C:
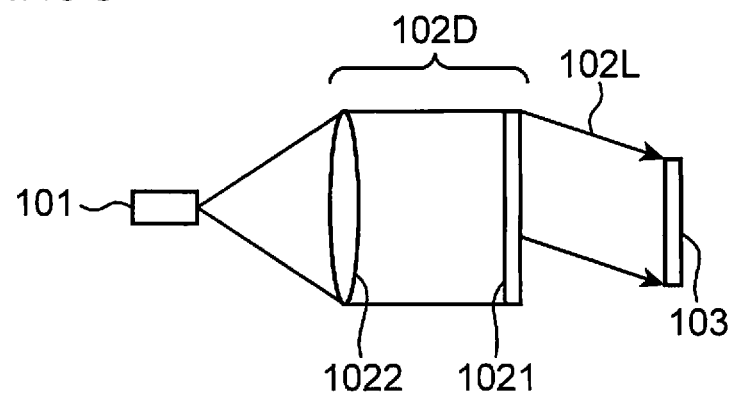
Figure 29:
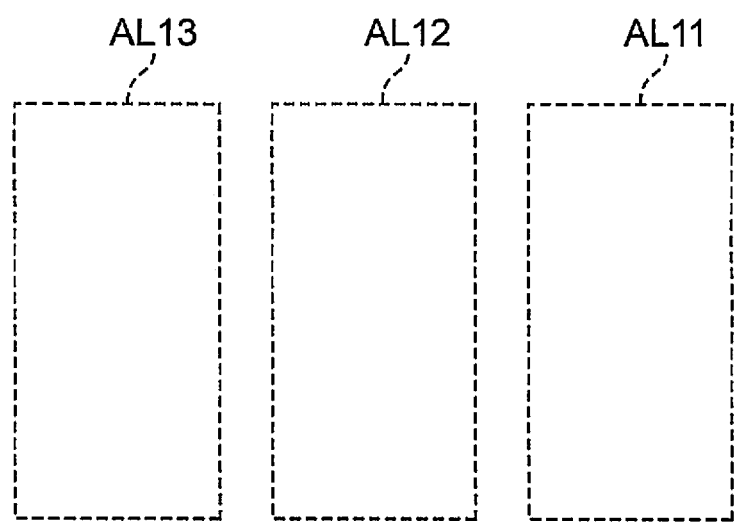
FIG. 29 is a diagram depicting display areas of a fictive image according to Embodiment 4.

FIG. 27 is a functional block diagram of a display device 1D according to Embodiment 4. FIGS. 28A, 28B and 28C are diagrams depicting the configuration and operation of an illumination optical system 102D according to Embodiment 4. FIG. 29 is a diagram depicting display areas of a fictive image according to Embodiment 4. The configuration of the display device 1D according to Embodiment 4 is similar to that of Embodiment 1 shown in FIG. 2, therefore description is omitted for composing elements similar to those of Embodiment 1.

The differences of the display device 1D from the display device 1 shown in FIG. 1 and FIG. 2 are that an illumination optical system 102D is included instead of the illumination optical system 102, and a control unit 105D is included instead of the control unit 105. The control unit 105D includes a CPU 11D and a memory 12D. As function blocks, the CPU 11D includes an image management unit 903, a diffraction pattern generation unit 905D, a display control unit 906, and a deflection control unit 909. The CPU 11D implements each of the functional blocks mentioned above by executing programs stored in the memory 12D. A function of each functional block in FIG. 28 will be described later.

The illumination optical system 102D according to Embodiment 4 changes an incident angle of the illumination light 102L with respect to the spatial modulation element 103 depending on the position of a fictive image to be displayed to the user.

In Embodiment 4, as FIGS. 28A, 28B and 28C show, the illumination optical system 102D includes a deflecting element 1021 and a collimator lens 1022. The collimator lens 1022 adjusts the light from the light source 101 to approximately parallel light. The deflecting element 1021 changes the direction of the approximately parallel emission light (that is, illumination light 102L to illuminate the spatial modulation element 103) from the collimator lens 1022.

In the case of FIG. 28A, the operation of the deflecting element 1021 is controlled by the deflection control unit 909 so that the light is diffracted to the right side of the field of view of the user. As a result, a fictive image is displayed in a display area AL11 in FIG. 29. In the case of FIG. 28B, the operation of the deflecting element 1021 is controlled by the deflection control unit 909 so that the light is diffracted to the front of the field of view of the user. As a result, the fictive image is displayed in a display area AL12 in FIG. 29. In the case of FIG. 28C, the operation of the deflecting element 1021 is controlled by the deflection control unit 909 so that the light is diffracted to the left side of the field of view of the user. As a result, the fictive image is displayed in a display area AL13 in FIG. 29.

In this embodiment, the display area AL11 corresponds to an example of the first setting area, the display area AL12 corresponds to an example of the second setting area, the direction of the illumination light 102L shown in FIG. 28A corresponds to an example of the first direction, and the direction of the illumination light 102L shown in FIG. 28B corresponds to an example of the second direction.

Figure 30:
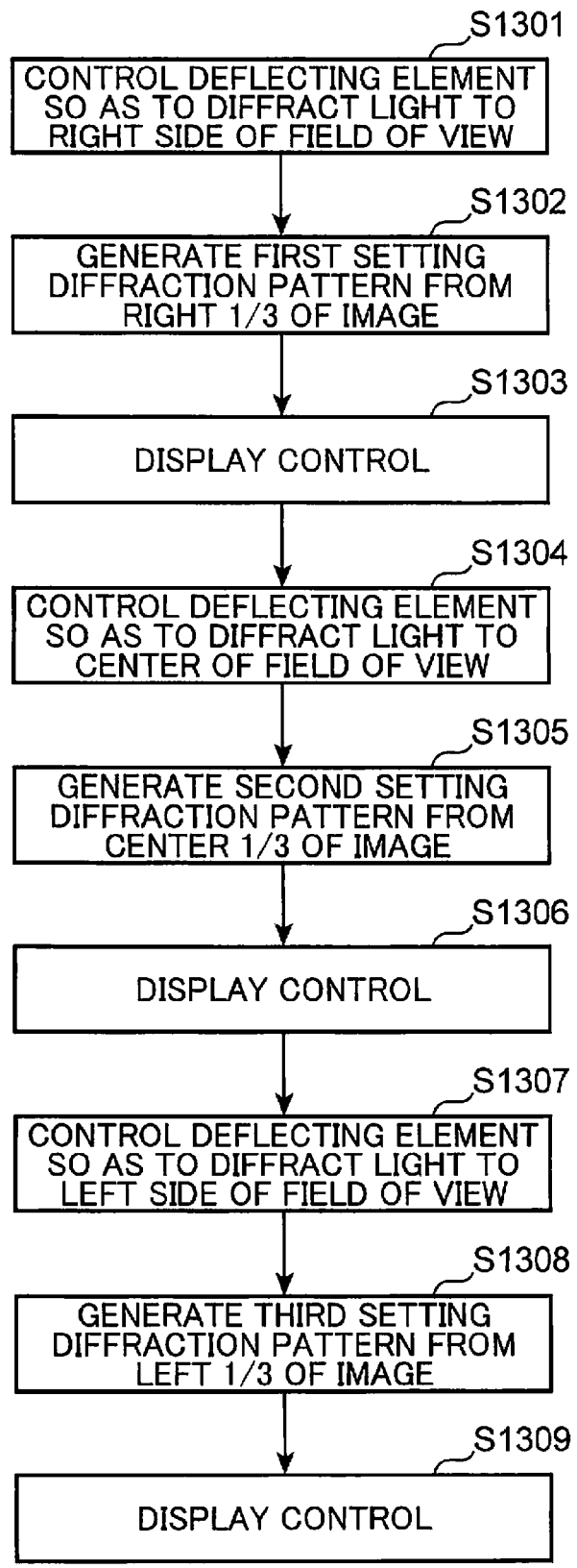
FIG. 30 is a flow chart depicting an operation according to Embodiment 4.

FIG. 30 is a flow chart depicting an operation according to Embodiment 4. In Embodiment 4, the control unit 105D displays an image with a wide field of view by executing the processing in steps S1301 to S1309 in FIG. 30.

<Step S1301> (Deflecting Element Control)

In step S1301, the deflection control unit 909 controls the deflecting element 1021 so that the light is diffracted to the right side of the field of view of the user, as shown in FIG. 28A.

<Step S1302> (Diffraction Pattern Generation)

In step S1302, the diffraction pattern generation unit 905D acquires an image to be displayed to the user from the image management unit 903. The diffraction pattern generation unit 905D adds a random phase value in a range of 0 to 2π to each pixel of an image in the right ⅓ partial area out of the acquired image, and then performs inverse Fourier transform, so as to generate a first setting diffraction pattern corresponding to the right ⅓ area of the image.

The diffraction pattern generation unit 905D notifies the generated first setting diffraction pattern to the display control unit 906.

<Step S1303> (Display Control)

In step S1303, the display control unit 906 displays the first setting diffraction pattern, generated by the diffraction pattern generation unit 905D in the previous step S1302, on the spatial modulation element 103. Thereby, the fictive image is displayed on the display area AL11 in FIG. 29.

<Step S1304> (Deflecting Element Control)

In step S1304, the deflection control unit 909 controls the deflecting element 1021 so that the light is diffracted to the center of the field of view of the user, as shown in FIG. 28B.

<Step S1305> (Diffraction Pattern Generation)

In step S1305, the diffraction pattern generation unit 905D adds a random phase value in a range of 0 to 2π to each pixel of an image in the center ⅓ partial area out of the image acquired from the image management unit 903 in step S1302, and then performs inverse Fourier transform, so as to generate a second setting diffraction pattern corresponding to the center ⅓ partial area of the image.

The diffraction pattern generation unit 905D notifies the generated second setting diffraction pattern to the display control unit 906.

<Step S1306> (Display Control)

In step S1306, the display control unit 906 displays the second setting diffraction pattern, generated by the diffraction pattern generation unit 905D in the previous step S1305, on the spatial modulation element 103. Thereby, the fictive image is displayed on the display area AL12 in FIG. 29.

<Step S1307> (Deflecting Element Control)

In step S1307, the deflection control unit 909 controls the deflecting element 1021 so that the light is diffracted to the left side of the field of view of the user, as shown in FIG. 28C.

<Step S1308> (Diffraction Pattern Generation)

In step S1308, the diffraction pattern generation unit 905D adds a random phase value in a range of 0 to 2π to each pixel of an image in the left ⅓ partial area out of the image acquired from the image management unit 903 in step S1302, then performs inverse Fourier transform, so as to generate a third setting diffraction pattern corresponding to the left ⅓ partial area of the image.

The diffraction pattern generation unit 905D notifies the generated third setting diffraction pattern to the display control unit 906.

<Step S1309> (Display Control)

In step S1309, the display control unit 906 displays the third setting diffraction pattern, generated by the diffraction pattern generation unit 905D in the previous step S1308, on the spatial modulation element 103. Thereby, the fictive image is displayed on the display area AL13 in FIG. 29.

According to Embodiment 4, by executing the above processing in steps S1301 to S1309, the deflecting element 1021 switches the direction of the illumination light 102L for illuminating the spatial modulation element 103, and synchronizing with this switching, the diffraction pattern generation unit 905D switches the partial area of the original image where the diffraction pattern is generated.

A problem of the image display using CGH is that the diffraction angle cannot be increased in a case where the pitch of the interference fringes, which can be displayed on the spatial modulation element 103 (that is, interference fringes formed on the surface of the spatial modulation element 103) is large. However, according to Embodiment 4, the incident direction of the illumination light 102L with respect to the spatial modulation element 103 is changed corresponding to an area of a fictive image which the user visually recognizes. As a result, according to Embodiment 4, the insufficiency of the diffraction angle can be compensated, and the viewing angle of a fictive image to be displayed to the user can be widened.

In Embodiment 4, the deflecting element 1021 switches the direction of the illumination light 102L in three types of directions, as shown in FIGS. 28A, 28B and 28C, but the configuration is not limited to this. The deflecting element 1021 may switch the direction of the illumination light 102L in two types of directions or in four or more types of directions.

In Embodiment 4, the diffraction pattern generation unit 905D may generate a correction pattern for correcting aberration on the reflecting mirror 104. The diffraction pattern generation unit 905D may generate a first setting composite diffraction pattern, in which the first setting diffraction pattern and the correction pattern are combined, as the diffraction pattern. The diffraction pattern generation unit 905D may generate a second setting composite diffraction pattern, in which the second setting diffraction pattern and the correction pattern are combined, as the diffraction pattern. Further, the diffraction pattern generation unit 905D may generate a third setting composite diffraction pattern, in which the third setting diffraction pattern and the correction pattern are combined, as the diffraction pattern. With this configuration, the image quality of the fictive image can be improved.

In this case, an area of the reflecting mirror 104, where the illumination light 102L enters, is different depending on whether the direction of the illumination light 102L is as shown in FIG. 28A, or as shown in FIG. 28B, or as shown in FIG. 28C. Therefore, the diffraction pattern generation unit 905D may generate the correction pattern to be combined with the first setting diffraction pattern (correction pattern used for the case where the direction of the illumination light 102L is as shown in FIG. 28A), the correction pattern to be combined with the second setting diffraction pattern (correction pattern used for the case where the direction of illumination light 102L is as shown in FIG. 28B), and the correction pattern to be combined with the third setting diffraction pattern (correction pattern used for the case where the direction of illumination light 102L is as shown in FIG. 28C), to be different from one another. With this configuration, the aberration on the reflecting mirror 104 can be more appropriately corrected, and image quality of the fictive image can be further improved.

The deflecting element 1021 is not limited to a specific configuration, but may be implemented to have an arbitrary configuration. For example, the deflecting element 1021 may be implemented using a liquid crystal panel that can diffract incident light by forming interference fringes on its surface, and can switch presence or absence of the diffraction function at high-speed. In this case, the display position of a fictive image can be switched at high-speed. As a result, the frame rate of the fictive image for the user to visually recognize can be improved.

The embodiments described above are examples, and can be modified into various embodiments without departing from the true spirit and scope of an aspect of the present disclosure. For example, a display device may be carried out by combining the above embodiments.

Figure 31:
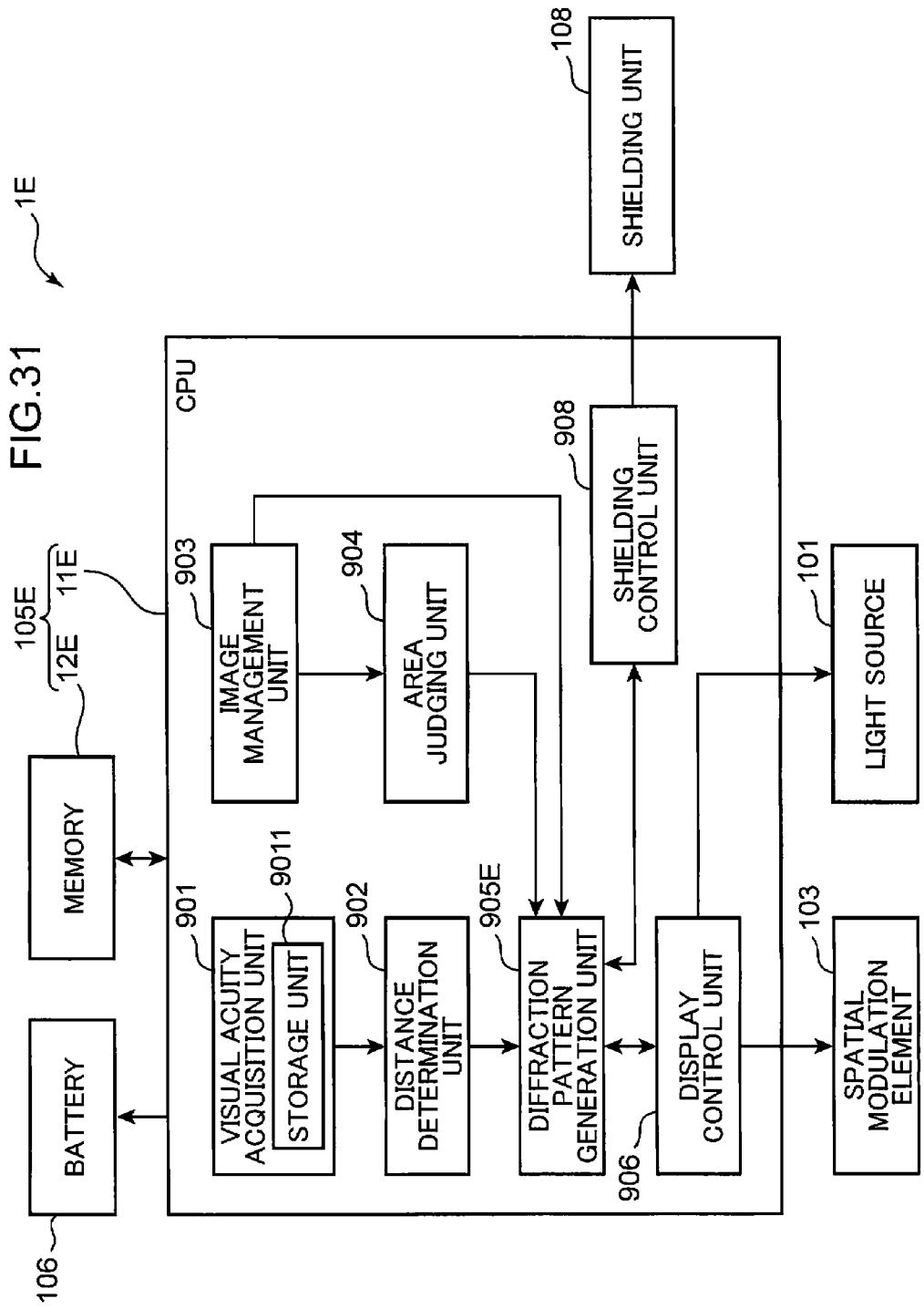
FIG. 31 shows an example of functional blocks of a display device of an embodiment combining Embodiments 1 and 3.

FIG. 31 is a functional block diagram of a display device 1E, which is an embodiment combining Embodiments 1 and 3. The differences of the display device 1E from the display device 1 shown in FIG. 1 are that a control unit 105E is included instead of the control unit 105, and a shielding unit 108 is further included. The control unit 105E includes a CPU 11E and a memory 12E. As functional blocks, the CPU 11E includes a visual acuity acquisition unit 901, a distance determination unit 902, an image management unit 903, an area judging unit 904, a diffraction pattern generation unit 905E, a display control unit 906 and a shielding control unit 908. The CPU 11E implements each of the functional blocks mentioned above by executing programs stored in the memory 12E.

The diffraction pattern generation unit 905E has functions combining the functions of the diffraction pattern generation unit 905 and the diffraction pattern generation unit 905C. According to the display device 1E of FIG. 31, the combined effects of Embodiments 1 and 3 can be implemented, such as widening the viewing angle of a fictive image to be displayed, and improving the image quality of a specific area.

Figure 32:
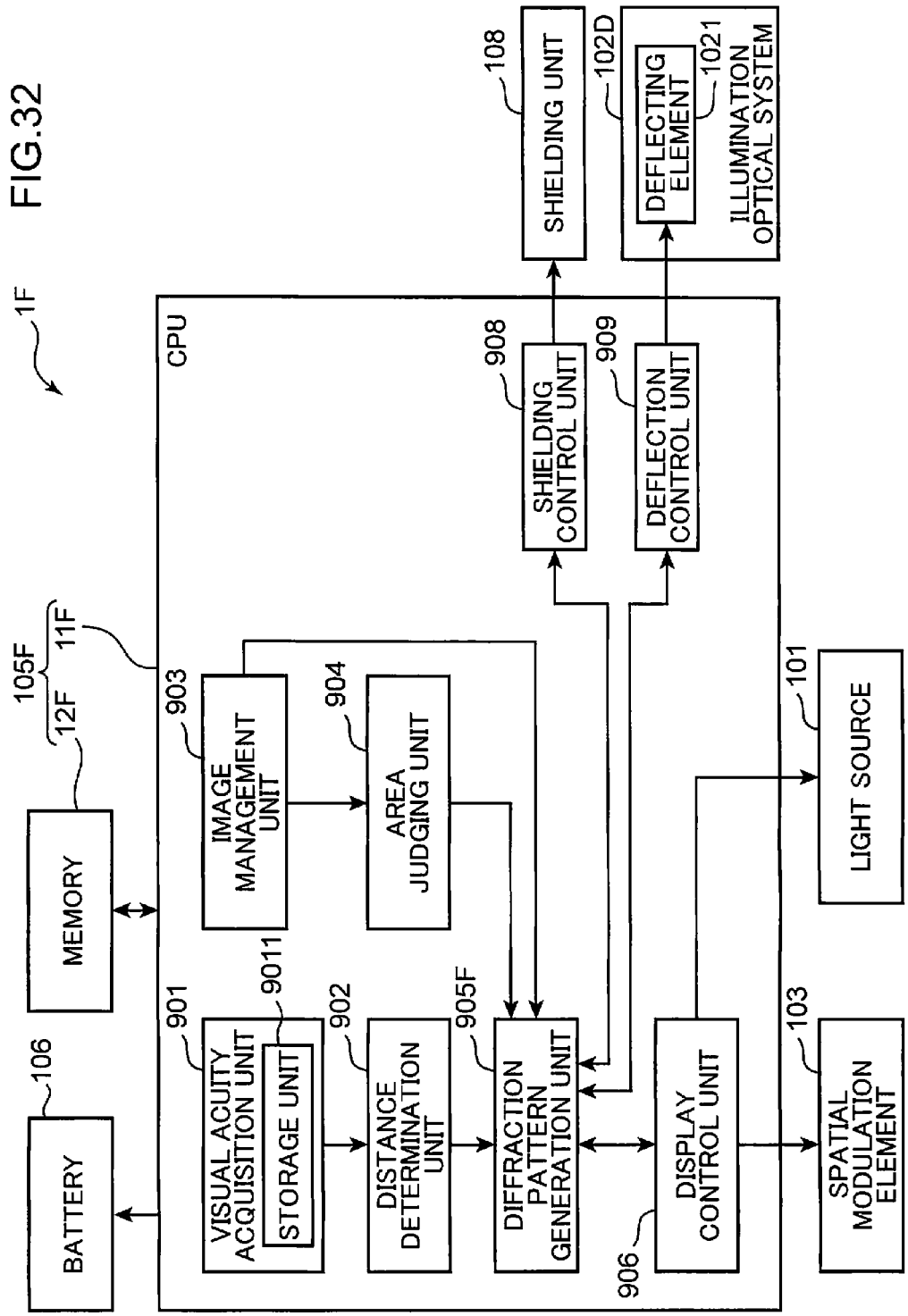
FIG. 32 shows an example of functional blocks of a display device of an embodiment combining Embodiments 1, 3 and 4.

FIG. 32 is a functional block diagram of a display device 1F, which is an embodiment combining Embodiments 1, 3 and 4. The differences of the display device 1F from the display device 1 shown in FIG. 1 and FIG. 2 are that an illumination optical system 102D including a deflecting element 1021 is included instead of the illumination optical system 102, a control unit 105F is included instead of the control unit 105, and a shielding unit 108 is further included. The control unit 105F includes a CPU 11F and a memory 12F. As functional blocks, the CPU 11F includes a visual acuity acquisition unit 901, a distance determination unit 902, an image management unit 903, an area judging unit 904, a diffraction pattern generation unit 905F, a display control unit 906, a shielding control unit 908 and a deflection control unit 909. The CPU 11F implements each of the functional blocks mentioned above by executing programs stored in the memory 12F.

The diffraction pattern generation unit 905F has functions combining the functions of the diffraction pattern generation unit 905, the diffraction pattern generation unit 905C and the diffraction pattern generation unit 905D. According to the display device 1F of FIG. 32, the combined effects of Embodiments 1, 3 and 4 can be implemented, such as further widening the viewing angle of a fictive image to be displayed, and improving the image quality of a specific area.

In the display device 1E of the embodiment in FIG. 31, the CPU 11E of the control unit 105E may further include the quantization unit 907 of Embodiment 2 (FIG. 12). Furthermore, in the display device 1F of the embodiment in FIG. 32, the CPU 11F of the control unit 105F may further include the quantization unit 907 of Embodiment 2 (FIG. 12). With these configuration, the effects of the Embodiment 2 can be implemented respectively.

Figure 33:
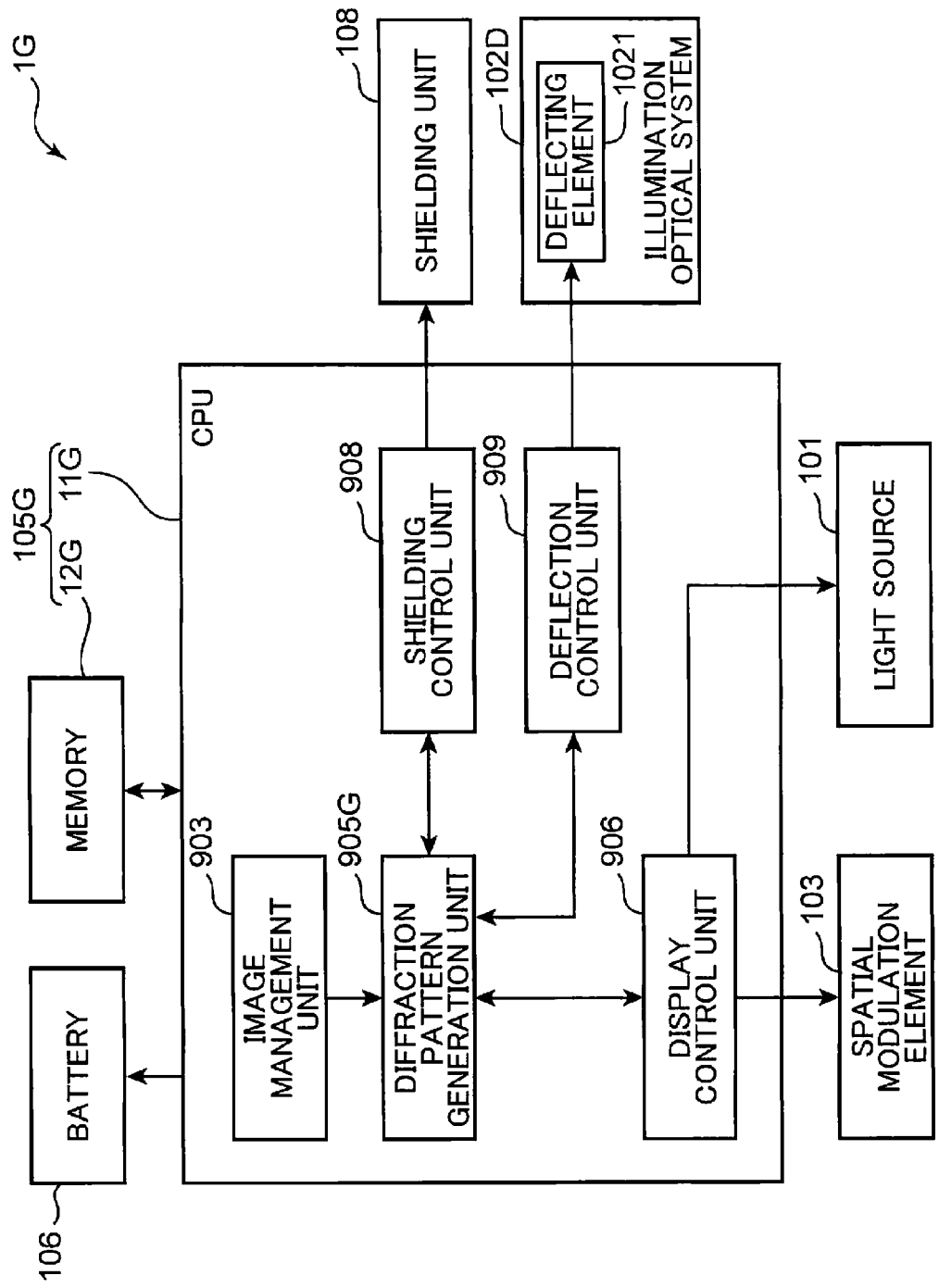
FIG. 33 shows an example of functional blocks of a display device of an embodiment combining Embodiments 3 and 4.

FIG. 33 is a functional block diagram of a display device 1G, which is an embodiment combining Embodiments 3 and 4. The differences of the display device 1G from the display device 1 shown in FIG. 1 and FIG. 2 are that an illumination optical system 102D including a deflecting element 1021 is included instead of the illumination optical system 102, a control unit 105G is included instead of the control unit 105, and a shielding unit 108 is further included. The control unit 105G includes a CPU 11G and a memory 12G. As functional blocks, the CPU 11G includes an image management unit 903, a diffraction pattern generation unit 905G, a display control unit 906, a shielding control unit 908 and a deflection control unit 909. The CPU 11G implements each of the functional blocks mentioned above by executing programs stored in the memory 12G.

The diffraction pattern generation unit 905G has functions combining the functions of the diffraction pattern generation unit 905C and the diffraction pattern generation unit 905D. According to the display device 1G of FIG. 33, the combined effects of Embodiments 3 and 4 can be implemented, such as further widening the viewing angle of a fictive image to be displayed.

The above described embodiments mainly include an aspect that has the following configurations.

A display device according to an aspect of the present disclosure, comprises: a light source that outputs laser light; an illumination optical system that emits the laser light as illumination light; a diffraction pattern generation unit that generates a diffraction pattern from an original image; a spatial modulation element that is illuminated by the illumination light, diffracts the illumination light by displaying the diffraction pattern to generate diffracted light, and displays the original image to a user as a fictive image by causing the user to visually recognize the generated diffracted light; and a shielding unit that is disposed on an optical path of the diffracted light, and has a first partial area and a second partial area adjacent to the first partial area, wherein the shielding unit is configured so as to selectively enter one of a plurality of states including a first state where the first partial area is a transmitting area that transmits the diffracted light and where the second partial area is a shielding area that shields the diffracted light, and a second state where the first partial area is the shielding area and where the second partial area is the transmitting area, the spatial modulation element displays the fictive image on a first display area corresponding to the first partial area when the shielding unit is in the first state, and displays the fictive image in a second display area corresponding to the second partial area when the shielding unit is in the second state, and the diffraction pattern generation unit generates a first portion diffraction pattern from an image in an area corresponding to the first display area out of the original image when the shielding unit is in the first state, and generates a second portion diffraction pattern from an image in an area corresponding to the second display area out of the original image when the shielding unit is in the second state.

According to this configuration, laser light is outputted from the light source. The laser light is emitted from the illumination optical system as illumination light. The diffraction pattern generation unit generates a diffraction pattern from an original image. The spatial modulation element, which is illuminated by the illumination light, displays the diffraction pattern, whereby the illumination light is diffracted and diffracted light is generated. The spatial modulation element displays the original image to the user as a fictive image by causing the user to visually recognize the generated diffracted light. Since the shielding unit is disposed on the optical path of the diffracted light, the diffracted light enters the shielding unit. The shielding unit has the first partial area and the second partial area adjacent to the first partial area. The shielding unit is configured so as to selectively enter one of a plurality of states, including the first state where the first partial area is a transmitting area that transmits the diffracted light and the second partial area is a shielding area that shields the diffracted light, and a second state where the first partial area is the shielding area and the second partial area is the transmitting area.

The spatial modulation element displays the fictive image on the first display area corresponding to the first partial area when the shielding unit is in the first state, and displays the fictive image in the second display area corresponding to the second partial area when the shielding unit is in the second state. The diffraction pattern generation unit generates the first portion diffraction pattern from the image in the area corresponding to the first display area out of the original image when the shielding unit is in the first state, and generates the second portion diffraction pattern from the image in the area corresponding to the second display area out of the original image when the shielding unit is in the second state. Therefore, the fictive image extending from the first display area to the second display area can be displayed. As a result, according to this configuration, the viewing angle of the fictive image displayed to the user can be widened.

In the above display device, the diffraction pattern generation unit may generate at least one type of correction pattern to correct the diffraction pattern, generate a first portion composite diffraction pattern in which the generated correction pattern and the first portion diffraction pattern are combined, and generate a second portion composite diffraction pattern in which the generated correction pattern and the second portion diffraction pattern are combined.

According to this configuration, the diffraction pattern generation unit generates at least one type of correction pattern to correct the diffraction pattern. The diffraction pattern generation unit also generates the first portion composite diffraction pattern in which the generated correction pattern and the first portion diffraction pattern are combined. Further, the diffraction pattern generation unit generates the second portion composite diffraction pattern in which the generated correction pattern and the second portion diffraction pattern are combined. Therefore, with this configuration, a fictive image to be displayed can be appropriately corrected.

The above display device may further comprise: a visual acuity acquisition unit that acquires visual acuity of the user; and a position determination unit that determines an optimum reconstruction position of the fictive image according to the visual acuity of the user, wherein the diffraction pattern generation unit may generate the correction pattern so that the fictive image is displayed at the optimum reconstruction position.

According to this configuration, the visual acuity acquisition unit acquires the visual acuity of the user. The position determination unit determines the optimum reconstruction position of the fictive image according to the visual acuity of the user. The diffraction pattern generation unit generates the correction pattern so that the fictive image is displayed at the optimum reconstruction position. Therefore, with this configuration, the fictive image can be displayed with an appropriate image quality matching the visual acuity of the user.

In the above display device, the shielding unit may be disposed with respect to the spatial modulation element so that, out of the diffracted light, plus first-order diffracted light enters the first partial area and minus first-order diffracted light enters the second partial area.

According to this configuration, the plus first-order diffracted light, out of the diffracted light, enters the first partial area. Therefore, the fictive image is displayed in the first display area by the plus first-order diffracted light when the shielding unit is in the first state. The minus first-order diffracted light, out of the diffracted light, enters the second partial area. Therefore, the fictive image is displayed in the second display area by the minus first-order diffracted light when the shielding unit is in the second state. As a result, with this configuration, the viewing angle of the fictive image to be displayed can be widened by using different order diffracted lights of plus first-order and minus first-order.

The above display device may further comprise a reflecting mirror that reflects the diffracted light toward the user, wherein the shielding unit may be disposed in a vicinity of an intermediate position between the spatial modulation element and the reflecting mirror.

According to this configuration, the diffracted light is reflected toward the user by the reflecting mirror. The shielding unit is disposed in a vicinity of an intermediate position between the spatial modulation element and the reflecting mirror. Therefore, with this configuration, the plus first-order diffracted light and the minus first-order diffracted light can be more appropriately separated at the position of the shielding unit, compared with a configuration where the shielding unit is disposed in a vicinity of the spatial modulation element. As a result, the light quantity of the diffracted light other than required diffracted light, which transmits through the transmitting area of the shielding unit, can be decreased.

The above display device may further comprise a collective optical system that collects the diffracted light, wherein the shielding unit may be disposed in a vicinity of a collecting position of the diffracted light that is collected by the collective optical system.

According to this configuration, the shielding unit is disposed in a vicinity of the collecting position of the diffracted light that is collected by the collective optical system. When the diffracted light is collected, the zero-order diffracted light and the plus first-order diffracted light are appropriately separated, and the zero-order diffracted light and the minus first-order diffracted light are appropriately separated, at the collecting position. Therefore, with this configuration, the transmitted light quantity of the zero-order diffracted light is reduced, and mostly plus first-order diffracted light can be transmitted when the shielding unit is in the first state, and the transmitted light quantity of the zero-order diffracted light is reduced, and mostly minus first-order diffracted light can be transmitted when the shielding unit is in the second state. As a result, undesired light for display of the fictive image can be appropriately shielded.

In the above display device, the shielding unit may include a liquid crystal panel that is configured to be able to diffract incident light by forming interference fringes on a surface thereof, and is configured to be able to control presence or absence of the interference fringes by applying voltage.

According to this configuration, the liquid crystal panel is configured to be able to diffract incident light by forming interference fringes on a surface thereof, and is configured to be able to control presence or absence of the interference fringes by applying voltage. Therefore, with this configuration, the diffracted light used for displaying a fictive image can be switched at high-speed. As a result, the frame rate of the fictive image can be improved.

In the above display device, the illumination optical system may include a deflecting element that changes a direction of the illumination light with respect to the spatial modulation element, the deflecting element may be configured to be able to change the direction of the illumination light to a first direction in which the display area of the fictive image is a first setting area, and to a second direction in which the display area of the fictive image is a second setting area which is adjacent to the first setting area, and the diffraction pattern generation unit may generate a first setting diffraction pattern from an image in an area corresponding to the first setting area out of the original image when the direction of the illumination light is the first direction, and generate a second setting diffraction pattern from an image in an area corresponding to the second setting area out of the original image when the direction of the illumination light is the second direction.

According to this configuration, the deflecting element changes a direction of the illumination light with respect to the spatial modulation element to the first direction in which the display area of the fictive image is the first setting area, and to the second direction in which the display area of the fictive image is the second setting area which is adjacent to the first setting area. The diffraction pattern generation unit generates the first setting diffraction pattern from the image in the area corresponding to the first setting area out of the original image when the direction of the illumination light is the first direction. The diffraction pattern generation unit also generates the second setting diffraction pattern from the image in the area corresponding to the second setting area out of the original image when the direction of the illumination light is the second direction. For example, in the case where the pitch of the interference fringes that the spatial modulation element can display is large because the pixel width of the spatial modulation element is wide, the diffraction angle cannot be so wide. This narrows the viewing angle of the fictive image to be displayed. According to this configuration however, the fictive image can be displayed in an area extending from the first setting area to the second setting area. As a result, with this configuration, the viewing angle of the fictive image to be displayed can be widened even when a spatial modulation element, of which pixel width is wide, is used.

In the above display device, the diffraction pattern generation unit may generate at least one type of correction pattern to correct the diffraction pattern, generate a first setting composite diffraction pattern in which the generated correction pattern and the first setting diffraction pattern are combined, and generate a second setting composite diffraction pattern in which the generated correction pattern and the second setting diffraction pattern are combined.

According to this configuration, the diffraction pattern generation unit generates at least one type of correction pattern to correct the diffraction pattern. The diffraction pattern generation unit also generates the first setting composite diffraction pattern in which the generated correction pattern and the first setting diffraction pattern are combined. Further, the diffraction pattern generation unit generates the second setting composite diffraction pattern in which the generated correction pattern and the second setting diffraction pattern are combined. Therefore, with this configuration, the fictive image to be displayed can be appropriately corrected.

The above display device may further comprise: a visual acuity acquisition unit that acquires visual acuity of the user; and a position determination unit that determines an optimum reconstruction position of the fictive image according to the visual acuity of the user, wherein the diffraction pattern generation unit may generate the correction pattern so that the fictive image is displayed at the optimum reconstruction position.

According to this configuration, the visual acuity acquisition unit acquires the visual acuity of the user. The position determination unit determines an optimum reconstruction position of the fictive image according to the visual acuity of the user. The diffraction pattern generation unit generates the correction pattern so that the fictive image is displayed at the optimum reconstruction position. Therefore, with this configuration, the fictive image can be displayed with an appropriate image quality matching the visual acuity of the user.

The above display device may further comprise an area judging unit that judges a specific area out of the original image, wherein the diffraction pattern generation unit may generate a specific correction pattern for correcting the diffraction pattern based on the position of the specific area in the original image, and generate a specific composite diffraction pattern in which the generated specific correction pattern and the generated diffraction pattern are combined.

According to this configuration, the area judging unit judges a specific area out of the original image. The diffraction pattern generation unit generates a specific correction pattern based on the position of the specific area in the original image. The diffraction pattern generation unit also generates a specific composite diffraction pattern in which the generated specific correction pattern and the generated diffraction pattern are combined. Therefore, with this configuration, an area of the fictive image corresponding to the specific area, out of the original image, can be appropriately corrected.

The above display device may further comprise: a visual acuity acquisition unit that acquires visual acuity of the user; and a position determination unit that determines an optimum reconstruction position of the fictive image according to the visual acuity of the user, wherein the diffraction pattern generation unit may generate the specific correction pattern so that an area corresponding to the specific area, out of the fictive image, is displayed at the optimum reconstruction position.

According to this configuration, the visual acuity acquisition unit acquires the visual acuity of the user. The position determination unit determines the optimum reconstruction position of the fictive image according to the visual acuity of the user. The diffraction pattern generation unit generates the specific correction pattern so that the area corresponding to the specific area, out of the fictive image, is displayed at the optimum reconstruction position. Therefore, with this configuration, the specific area of the fictive image can be displayed with an appropriate image quality matching the visual acuity of the user.

In the above display device, the diffraction pattern generation unit may determine a specific position to generate the specific correction pattern so that the area corresponding to the specific area, out of the fictive image, is displayed at the optimum reconstruction position; and may generate the specific correction pattern from a phase in a case where a spherical wave from a point light source virtually disposed in the specific position enters the spatial modulation element.

According to this configuration, the diffraction pattern generation unit determines a specific position to generate the specific correction pattern so that the area corresponding to the specific area, out of the fictive image, is displayed at the optimum reconstruction position. The diffraction pattern generation unit also generates the specific correction pattern from a phase in a case where a spherical wave, from a point light source virtually disposed in the specific position, enters the spatial modulation element. Therefore, with this configuration, the area of the fictive image corresponding to the specific area of the original image can be disposed in the position matching the visual acuity of the user, and the visibility of information, displayed in the area corresponding to the specific area, can be improved.

The above display device may further comprise a line-of-sight detection unit that detects a line-of-sight position of the user, wherein the area judging unit may judge, as the specific area, an area of the original image corresponding to an area of the fictive image including the line-of-sight position of the user.

According to this configuration, the line-of-sight detection unit detects a line-of-sight position of the user. The area judging unit judges, as the specific area, the area of the original image corresponding to the area of the fictive image including the line-of-sight position of the user. Therefore, with this configuration, the image quality in the area of the fictive image including the line-of-sight position of the user can be optimized, and a drop in image quality of the fictive image visually recognized by the user can be suppressed.

The above display device may further comprise a quantization unit that quantizes a phase value of the diffraction pattern, wherein each pixel of the spatial modulation element may be configured to be able to display two or more types of specific phase values in a range of 0 to $2\pi$, and the quantization unit may quantize the phase value of the diffraction pattern to the specific phase value, so as to decrease quantization noise in an area of the fictive image corresponding to the specific area.

According to this configuration, the quantization unit quantizes a phase value of the diffraction pattern. Each pixel of the spatial modulation element is configured to be able to display two or more types of specific phase values in a range of 0 to $2\pi$. The quantization unit quantizes the phase value of the diffraction pattern to the specific phase value, so as to decrease quantization noise in an area of the fictive image corresponding to the specific area. Therefore, with this configuration, when a spatial modulation element that can display a specific phase value, such as a ferroelectric liquid crystal element, is used, the quantization noise generated when the phase value of the diffraction pattern is quantized can be suppressed in the area of the fictive image corresponding to the specific area.

In the above display device, the quantization unit may perform quantization using error diffusion for diffusing an error generated by quantization into peripheral pixels, and change a ratio of allocating an error into the peripheral pixels depending on the position of the specific area in the original image, so as to reduce the quantization noise in the area of the fictive image corresponding to the specific area.

According to this configuration, the quantization unit performs quantization using error diffusion for diffusing an error generated by quantization into peripheral pixels. The quantization unit also changes a ratio of allocating an error into the peripheral pixels depending on the position of the specific area in the original image, so as to reduce the quantization noise in the area of the fictive image corresponding to the specific area. Therefore, with this configuration, the quantization noise in the area of the fictive image corresponding to the specific area can be suppressed, and visibility of information that is displayed on the area corresponding to the specific area can be improved.

A display device according to an aspect of the present disclosure comprises: a light source that outputs laser light; an illumination optical system that emits the laser light as illumination light; a diffraction pattern generation unit that generates a diffraction pattern from an original image; and a spatial modulation element that is illuminated by the illumination light, diffracts the illumination light by displaying the diffraction pattern to generate diffracted light, and displays the original image to a user as a fictive image by causing the user to visually recognize the generated diffracted light, wherein the illumination optical system includes a deflecting element that changes a direction of the illumination light with respect to the spatial modulation element, the deflecting element is configured to be able to change the direction of the illumination light to a first direction in which the display area of the fictive image is a first setting area, and to a second direction in which the display area of the fictive image is a second setting area which is adjacent to the first setting area, and the diffraction pattern generation unit generates a first setting diffraction pattern from an image in an area corresponding to the first setting area out of the original image when the direction of the illumination light is the first direction, and generates a second setting diffraction pattern from an image in an area corresponding to the second setting area out of the original image when the direction of the illumination light is the second direction.

According to this configuration, laser light is outputted from the light source. The laser light is emitted from the illumination optical system as illumination light. The diffraction pattern generation unit generates a diffraction pattern from an original image. The spatial modulation element, which is illuminated by the illumination light, diffracts the illumination light by displaying the diffraction pattern to generate diffracted light. The spatial modulation element displays the original image to the user as a fictive image by causing the user to visually recognize the generated diffracted light. The deflecting element changes a direction of the illumination light with respect to the spatial modulation element to the first direction in which the display area of the fictive image is the first setting area, and to the second direction in which the display area of the fictive image is the second setting area which is adjacent to the first setting area. The diffraction pattern generation unit generates the first setting diffraction pattern from the image in the area corresponding to the first setting area out of the original image when the direction of the illumination light is the first direction. The diffraction pattern generation unit also generates the second setting diffraction pattern from the image in the area corresponding to the second setting area out of the original image when the direction of the illumination light is the second direction.

For example, in the case where the pitch of the interference fringes that the spatial modulation element can display is large because the pixel width of the spatial modulation element is wide, the diffraction angle cannot be so wide. This narrows the viewing angle of the fictive image to be displayed. According to this configuration however, the fictive image can be displayed in an area extending from the first setting area to the second setting area. As a result, with this configuration, the viewing angle of the fictive image to be displayed can be widened, even when a spatial modulation element, of which pixel width is wide, is used.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

INDUSTRIAL APPLICABILITY

A display device according to an aspect of the present disclosure is useful as a display device, such as an HMD, having a spatial modulation element near the eyeball of the user, which diffracts illumination light with laser light by displaying a diffraction pattern, so that the diffracted light generated by the spatial modulation element reaches the eyeballs. This display device can also be applied to other applications, including a display system, a display method and a display device design method.

What is claimed is:
1. A display device, comprising:
a light source that outputs laser light;
an illumination optical system that emits the laser light as illumination light;
a processor that generates a diffraction pattern from an original image, the diffraction pattern being different from the original image and being calculated to appear to a user as a fictive image at a distance from the user;
a spatial modulation element that is illuminated by the illumination light, diffracts the illumination light by displaying the diffraction pattern to generate diffracted light directed to a location of eyes of the user to create the fictive image calculated to appear at the distance from the user; and
a shield that is disposed on an optical path of the diffracted light, and has a first partial area and a second partial area adjacent to the first partial area, wherein
the shield is configured so as to selectively enter one of a plurality of states including a first state where the first partial area is a transmitting area that transmits the diffracted light and where the second partial area is a shielding area that shields the diffracted light, and a second state where the first partial area is the shielding area and where the second partial area is the transmitting area,
the spatial modulation element displays the diffraction pattern being generated by the processor on a first display area corresponding to the first partial area when the shielding unit is in the first state, and displays the diffraction pattern being generated by the processor in a second display area corresponding to the second partial area when the shield is in the second state, and
the processor generates, as the diffraction pattern, a first portion diffraction pattern from an image in an area corresponding to the first display area of the original image when the shield is in the first state, and generates, as the diffraction pattern, a second portion diffraction pattern from an image in an area corresponding to the second display area of the original image when the shield is in the second state.

2. The display device according to claim 1, wherein the processor:
generates at least one type of correction pattern;
generates, as the diffraction pattern, a first portion composite diffraction pattern in which the generated correction pattern and the first portion diffraction pattern are combined; and
generates, as the diffraction pattern, a second portion composite diffraction pattern in which the generated correction pattern and the second portion diffraction pattern are combined.

3. The display device according to claim 2, wherein the processor:
acquires visual acuity of the user; and
determines the distance from the eye of the user to the fictive image according to the visual acuity of the user.

4. The display device according to claim 3, further comprising a storage device that stores information on the visual acuity of the user, wherein the processor acquires the information on the visual acuity of the user from the storage device and the information is used to determine the distance.

5. The display device according to claim 1, wherein the shield is disposed with respect to the spatial modulation element so that, out of the diffracted light, plus first-order diffracted light enters the first partial area and minus first-order diffracted light enters the second partial area.

6. The display device according to claim 5, further comprising a reflecting mirror that reflects the diffracted light toward the user, wherein
the shield is disposed in a vicinity of an intermediate position between the spatial modulation element and the reflecting mirror.

7. The display device according to claim 5, further comprising a collective optical system that collects the diffracted light, wherein
the shield is disposed in a vicinity of a collecting position of the diffracted light that is collected by the collective optical system.

8. The display device according to claim 1, wherein
the shield includes a liquid crystal panel that is configured to be able to diffract incident light by forming interference fringes on a surface thereof, and is configured to be able to control presence or absence of the interference fringes by applying voltage.

9. The display device according to claim 1, wherein
the illumination optical system includes a deflecting element that changes a direction of the illumination light with respect to the spatial modulation element,
the deflecting element is configured to be able to change the direction of the illumination light to a first direction in which the display area of the fictive image is a first setting area, and to a second direction in which the display area of the fictive image is a second setting area which is adjacent to the first setting area, and
the processor generates a first setting diffraction pattern from an image in an area corresponding to the first setting area out of the original image when the direction of the illumination light is the first direction, and generates a second setting diffraction pattern from an image in an area corresponding to the second setting area out of the original image when the direction of the illumination light is the second direction.

10. The display device according to claim 9, wherein the processor:
generates at least one type of correction pattern to correct the diffraction pattern;

generates a first setting composite diffraction pattern in which the generated correction pattern and the first setting diffraction pattern are combined; and generates a second setting composite diffraction pattern in which the generated correction pattern and the second setting diffraction pattern are combined.

11. The display device according to claim 10, wherein the processor:

acquires visual acuity of the user;

determines an optimum reconstruction position of the fictive image according to the visual acuity of the user; and generates the correction pattern so that the fictive image is displayed at the optimum reconstruction position.

12. The display device according to claim 1, wherein the processor:

judges a specific area out of the original image, and generates a specific correction pattern for correcting the diffraction pattern based on the position of the specific area in the original image, and generates a specific composite diffraction pattern in which the generated specific correction pattern and the generated diffraction pattern are combined.

13. The display device according to claim 12, wherein the processor:

acquires visual acuity of the user;

determines an optimum reconstruction position of the fictive image according to the visual acuity of the user; and generates the specific correction pattern so that an area corresponding to the specific area, out of the fictive image, is displayed at the optimum reconstruction position.

14. The display device according to claim 13, wherein the processor:

determines a specific position to generate the specific correction pattern so that the area corresponding to the specific area, out of the fictive image, is displayed at the optimum reconstruction position; and generates the specific correction pattern from a phase in a case where a spherical wave from a point light source virtually disposed in the specific position enters the spatial modulation element.

15. The display device according to claim 12, wherein the processor:

detects a line-of-sight position of the user; and judges, as the specific area, an area of the original image corresponding to an area of the fictive image including the line-of-sight position of the user.

16. The display device according to claim 12, wherein the processor:

quantizes a phase value of the diffraction pattern, wherein each pixel of the spatial modulation element is configured to be able to display two or more types of specific phase values in a range of 0 to $2\pi$, and quantizes the phase value of the diffraction pattern to the specific phase value, so as to decrease quantization noise in an area of the fictive image corresponding to the specific area.

17. The display device according to claim 16, wherein the processor:

performs quantization using error diffusion for diffusing an error generated by quantization into peripheral pixels, and changes a ratio of allocating an error into the peripheral pixels depending on the position of the specific area in the original image, so as to reduce the quantization noise in the area of the fictive image corresponding to the specific area.

* * * * *